(12) United States Patent
Hagerty et al.

(10) Patent No.: US 7,373,597 B2
(45) Date of Patent: May 13, 2008

(54) CONVERSION OF TEXT DATA INTO A HYPERTEXT MARKUP LANGUAGE

(75) Inventors: Clark Gregory Hagerty, Highland Park, NJ (US); Frank A. Sonnenberg, Chester, NJ (US); David S. Pickens, Highland Park, NJ (US); Casimir A. Kulikowski, Highland Park, NJ (US)

(73) Assignee: University of Medicine & Dentistry of New Jersey, New Brunswick, NJ (US)

( * ) Notice: Subject to any disclaimer, the term of this patent is extended or adjusted under 35 U.S.C. 154(b) by 543 days.

(21) Appl. No.: 10/285,080

(22) Filed: Oct. 31, 2002

(65) Prior Publication Data

US 2003/0167442 A1 Sep. 4, 2003

Related U.S. Application Data

(60) Provisional application No. 60/336,231, filed on Oct. 31, 2001.

(51) Int. Cl.
*G06F 15/00* (2006.01)
*G06F 17/00* (2006.01)
(52) U.S. Cl. .................. 715/513; 715/517; 715/530
(58) Field of Classification Search ............... 715/513, 715/517, 530, 500
See application file for complete search history.

(56) References Cited

U.S. PATENT DOCUMENTS 5,737,739 A * 4/1998 Shirley et al. .............. 715/512
5,740,425 A * 4/1998 Povilus ...................... 707/100
5,893,127 A * 4/1999 Tyan et al. .................. 715/513
6,014,680 A * 1/2000 Sato et al. ................... 715/513
6,202,072 B1 3/2001 Kuwahara
6,529,954 B1 * 3/2003 Cookmeyer et al. ........ 709/224
6,851,087 B1 * 2/2005 Sibert ......................... 715/505
6,895,551 B1 * 5/2005 Huang et al. ............... 715/513
7,027,974 B1 * 4/2006 Busch et al. ................... 704/4
7,222,066 B1 * 5/2007 Oon ............................. 704/9
7,225,122 B2 * 5/2007 Shaw ........................... 704/9

(Continued)

OTHER PUBLICATIONS

Madigan, David, et al., "Repertory Hypergrids: An Application to Clinical Practice Guidelines", ECHT '94 Proceedings, 1994 ACM.*

(Continued)

*Primary Examiner*—Rachna Singh
(74) *Attorney, Agent, or Firm*—Watov & Kipnes, P.C.; Kenneth Watov

(57) ABSTRACT

Disclosed is a markup system and method for converting text-based guidelines into a form that allows manipulation and viewing in different formats and detail. The system identifies conditions described in electronic documents and uses an interactive or rule-based processor to annotate (or tag) the text with the symbols and vocabulary of a hypertext markup language. Any electronic document, text-based or having a mix of graphics, audio, video, and/or pre-defined hypertext in addition to text, containing statements, indices, variables, decision points, and recommendations is adaptable for use with this system. The annotated text may be provided to others over a network for application. The annotated text may also be parsed by a validation engine to check it against the original to see that the logic and sentence structure has not been damaged.

40 Claims, 15 Drawing Sheets

U.S. PATENT DOCUMENTS

| | | | |
|---|---|---|---|
| 2001/0032218 A1 | 10/2001 | Huang | |
| 2003/0033288 A1* | 2/2003 | Shanahan et al. | 707/3 |
| 2003/0037018 A1* | 2/2003 | Entwistle | 706/48 |
| 2003/0046114 A1* | 3/2003 | Davies et al. | 705/3 |

OTHER PUBLICATIONS

American College of Physicians. Guidelines for Medical Treatment for Stroke Prevention. Ann Intern Med. 121, 54-55 (1994).

Ellrodt, A.G. et al. Measuring and Improving Physician Compliance with Clinical Practive Guidelines. Ann. Intern Med. 122, 277-282 (1995).

Lomas, J. et al. Do Practice Guidelines Guide Practice? N.E. J. Med. 321, 1306-1311 (Nov. 9, 1989).

National Guideline Clearinghouse. Updated Dec. 9, 2002, retrieved from http://www.guidelines.gov/body_home.asp on Dec. 9, 2002.

Ohno-Machado, L. et al. The Guideline Interchange Format: A Model for Representing Guidelines. J. Am. Med. Informatics Assoc. 5, 357-372 (Jul./Aug. 1998).

Shiffman, R.N. et al. GEM: A Proposal for a More Comprehensive Guideline Document Model Using XML. J. Am. Med. Inform. Assoc. 7, 488-498 (2000).

Tierney, W.M. et al. Computerizing Guidelines to Improve Care and Patient Outcomes: The Example of Heart Failure. JAMIA 2, 316-322 (1995).

Tunis, S.R. et al. Internists' Attitudes about Clinical Practice Guidelines. Ann Intern Med. 120, 956-963 (1994).

World Wide Web Consortium. Updated Nov. 19, 2002, retrieved from http://www.w3.org on Nov. 21, 2002.

Jacobson, M. AMIA '97: Internet Access to Patient Data. Retrieved from http://www.medicalcomputingtoday.com/)aptdata.html on Mar. 26, 2002.

Sanders, N.W. et al. Web Client and ODBC Access to Legacy Database Information: A Low Cost Approach. AMIA, Inc. 799-803 (1997).

Tarczy-Hornoch, P. et al. Meeting Clinician Information Needs by Integrating Access to the Medical Record and Knowledge Resources via the Web. AMIA, Inc. 809-813 (1997).

Waitman, L.R. et al. Perioperative Information via the Web Enables Efficiency in Patient Care. AMIA, Inc. 1014 (1997).

Matchar, D. et al, "Medical Treatment for Stroke Prevention"; Annals of Internal Medicine, vol. 121, No. 1; Jul. 1, 1994.

* cited by examiner

Fig. 12A

| Variables | Related Conditions | Relation Statement |
|---|---|---|
| age | For patients older than 75 years | > 75 |
| asymptomatic | younger than 60 years | < 60 |
| atrial fibrillation | younger than 60 years | < 60 |
| candidates for anticoagulation | | |
| diabetes mellitus | | |
| do not respond to or tolerate aspirin | | |
| echocardiographic risk factors | | |
| heart disease | | |
| heavy alcohol use | | |
| hypercholesterolemia | | |
| hypertension | | |
| myocardial infarction | | |
| Nonvalvular atrial fibrillation | | |
| smoking | | |
| specific clinical risk factors | | |
| stenosis | | |
| stroke | | |
| symptomatic | | |
| TIA | | |
| unwilling or unable to take warfarin | | |
| when surgery can be done in a low-risk setting (total... | | |

Fig. 12B

| Conditions | Related Recommendations |
|---|---|
| heart disease | but aspirin therapy is a reasonable option (grade C recommendation). |
| heavy alcohol use | are candidates for ticlopidine (grade A recommendation) |
| high degrees of stenosis. | Aspirin is effective in reducing the risk for stroke |
| hypercholesterolemia | decisions about dose should be based on patient tolerance |
| hypertension | No evidence suggests that aspirin reduces the risk for stroke |
| less than 30% stenosis | Several conditions are associated with an especially high risk for stro.. |
| lower degrees of stenosis | |
| minor completed strokes | |
| minor stroke | |
| myocardial infarction | |
| Nonvalvular atrial fibrillation | |
| Previous myocardial infarction | |
| smoking | |
| specific clinical | |
| stroke | |
| symptomatic patients | |
| TIA | |
| Transient ischemic attack | |
| unwilling or unable to take warfarin | |
| when surgery can be done in a low-risk setting (total | |
| younger than 60 years | |

Fig. 12C

| Variables | Conditions | Recommendations |
|---|---|---|

| Recommendations | Related Conditions |
|---|---|
| but aspirin therapy is a reasonable option (grade C re... | Nonvalvular atrial fibrillation |
| are candidates for ticlopidine (grade A recommendati... | unwilling or unable to take warfarin |
| Aspirin is an alternative treatment strategy for stroke r... | |
| aspirin is an appropriate alternative (grade A recomm... | |
| Aspirin is effective in reducing the risk for stroke | |
| aspirin may not be effective | |
| benefit from carotid endarterectomy. | |
| Data are currently unavailable on the effectiveness o... | |
| decisions about dose should be based on patient tol... | |
| have a low risk for stroke and do not need treatment ... | |
| have worse outcomes with carotid endarterectomy | |
| neither anticoagulation nor antiplatelet agents are sp... | |
| No evidence suggests that aspirin reduces the risk fo... | |
| Several conditions are associated with an especially ... | |
| The evidence is less clear | |
| Therapeutic interventions directed at general, modifia... | |
| Warfarin has been shown to reduce the rate of stroke | |
| Warfarin is the drug of choice | |

Fig. 13

Guidelines Selected for Application: *Stroke*

Relevant Patient Characteristics

| Variable | Value |
|---|---|
| Nonvalvular atrial fibrillation | TRUE |
| TIA | TRUE |
| age | 70 |
| asymptomatic | FALSE |
| candidates for anticoagulation | TRUE |
| do not respond to or tolerate aspirin | FALSE |
| echocardiographic risk factors | TRUE |
| myocardial infarction | TRUE |
| specific clinical risk factors | TRUE |
| stenosis | 75 |
| stroke | TRUE |

CONVERSION OF TEXT DATA INTO A HYPERTEXT MARKUP LANGUAGE

CROSS-REFERENCE TO RELATED APPLICATIONS

This application claims priority to U.S. Provisional Patent Application Ser. No. 60/336,231, filed on Oct. 31, 2001, hereby incorporated herein by reference in its entirety.

CROSS-REFERENCE TO COMPUTER PROGRAM LISTING APPENDIX

A Computer Program Listing Appendix is submitted on a compact disk, filed herewith, which is hereby incorporated herein by reference in its entirety. The total number of compact discs including duplicates is two. The section of the present specification entitled "COMPUTER PROGRAM LISTING APPENDIX FILE LIST" describes all of the files contained on this compact disk.

COPYRIGHT NOTICE

This disclosure contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The methods disclosed herein relate to automated computer data processing, specifically the processing of text into hypertext and associated delivery tools and verification systems therefor.

2. Description of the Related Art

It has been widely recognized that use of clinical guidelines by clinicians is very low, even among those who profess to know about them and agree with them (see, for example, references [1] [2]). (The numbers in square brackets throughout this disclosure refer to the references listed in the "References" section below and are incorporated herein by reference in their entireties.)

Previous studies have documented the inability of traditional means for distributing guidelines, such as publication and didactic educational sessions, to increase their use [3]. This is so primarily for three reasons. First, clinicians may not remember to apply the guideline even if they are aware of it and agree with it. Second, the details of the guideline are not always readily accessible at the site of clinical care. Third, the traditional form of a published guideline may not make it immediately clear how to apply the guideline.

Guidelines traditionally have been distributed in print form in medical journals, books, or monographs. More recently, guidelines have been published electronically either on CD-ROM or in repositories based on the World Wide Web [4]. However, even with electronic distribution, most existing clinical guidelines are text documents. They often contain extensive background and reference material. This additional material is valuable, but once the clinician is familiar with the guideline the background and reference material are not needed for day-to-day clinical practice. It may be difficult to find quickly what is directly useful, e.g., the "bottom line" decision and action steps. This difficulty is due in part to the unstructured nature of text-based guidelines. A simple algorithmic summary of the guideline may not be available and if present, may be located in a variety of locations in the document. In addition, the language in a guideline may be intentionally ambiguous to satisfy the consensus process used to create it, or the guideline may lack coverage, be logically incomplete or appear to be contradictory [5].

Another feature of text-based guidelines that makes them more difficult to apply is that they may specify multiple choices of action and may leave the ultimate choice to the end-user's (e.g., decision maker, physician) judgment without making it clear how the choice is to be made.

Some researchers have promoted the idea of a shareable representation of clinical guidelines. For example, the Guideline Interchange Format (GLIF) [6] encodes explicitly in procedural form the steps for collecting information about a patient and making decisions. This process requires extensive expert encoding in a formal language, and is specifically designed for medical applications. Moreover, while it does produce a machine-interpretable form of the guideline, it does not preserve the relationship of the procedural component to the original published document. This can make it difficult to produce educational or reference applications of the guideline.

What is needed is a better encoding system that, at least in part, automatically encodes or converts text documents into a machine-interpretable or machine-readable form. The type of text documents are preferably not limited to medical documents, but include other types of documents as well. Such a system may also include tools for verifying and validating the encoded documents produced thereby and for adding or editing the system-generated codings. Such a system may also include a specialized coding language tailored to optimize the actual encoding.

SUMMARY

Presently disclosed is a system and method of use thereof based on the markup concept for converting text-based clinical guidelines or other documents into a machine-operable form that allows the converted guidelines to be manipulated by machine and viewed in different formats, and at various levels of detail, according to the needs of the practitioner while preserving their originally published form.

The process begins with text documents in electronic form, i.e., with "electronic documents." These may be physical documents (hard copy) that has been scanned into machine-recognizable form (e.g. ASCII or similar text coding) using any well-known optical character recognition (OCR) technology. Alternatively, text documents already in machine-readable form, such as Microsoft® Word, Adobe® Portable Document Format (PDF), ASCII text format, or other electronic documents presently known or yet to identified may be provided to the processing system. The natural language statements therein, i.e., the plain English sentences making up the document, are then parsed.

An at least partly automated, rule-based processor, which may employ heuristic decision making, operator intervention, or a combination of both techniques, then annotates (or "tags") the original text with the symbols and vocabulary of a hypertext markup language. In one embodiment, the hypertext markup language is a Hypertext Guideline Markup Language (HGML), further described below.

The resulting annotated text file, which may comprise the original and (content-wise) unaltered text plus HGML tags indicating and associating conditional logic relationships, is then saved in a common digital storage device or on one or more well-known storage media. The HGML tags may also indicate specific formatting instructions.

The stored HGML-annotated text file (simply referred to here as the "HGML file") may then be parsed by a validation engine. The validation engine may check the original text content against the text found in the HGML file to help detect inconsistencies by pointing out and/or clarifying overlapping recommendations or gaps in conditional logic coverage.

Finally, after the optional validation step, the HGML file may then be made available or distributed to researchers, clinicians, medical practitioners, and/or other end users for application to specific decision making and informational need fulfillment problems. Applicable problem areas include (but are not limited to) those seen in medical treatment decision making, system diagnostic and repair activities, business operations, customer care/support, and relationship management fields. Alternatively, a regulatory or standards-body vetting step may precede distribution, to enable further validation before release to the critical patient care environment.

In a still further alternate embodiment, the parsing, tagging, and validating system described herein may be applied to text files containing any abstraction of a "treatment" guideline, including but not limited to such abstractions as diagnostic or repair manuals for complex electrical or mechanical systems, operating or installation instructions, or travel guidebooks. Broadly speaking, any electronic document (either solely text-based or having a mix of graphics, audio, video, and/or pre-defined hypertext in addition to text) containing statements, indices, decision points, and/or conditional recommendations based on the indices or decision points is adaptable for use with the inventive system.

Furthermore, the inventive system may also be used with source electronic documents that contain non-textual data in addition to the above-described text elements. Graphics, flowcharts, photographs, sound or video annotations, or other non-text elements may be attached to, enclosed within, or otherwise associated with the HGML file, as by (although not limited to) conventional hypertext or Web programming methods.

BRIEF DESCRIPTION OF THE DRAWINGS

The present disclosure may be better understood and its numerous features and advantages made apparent to those skilled in the art by referencing the accompanying drawings.

FIGS. 7 through 16 are screen shots depicting the markup process steps using the GLEDITOR program according to one embodiment of the present invention. Specifically:

FIG. 7 is a screen shot depicting the identification of a condition by highlighting the desired text and pressing the "condition" button.

FIG. 8 is a screen shot depicting the guideline text after a condition (underlined) and recommendation (grey) have been identified.

FIG. 10 is a screen shot depicting the refinement of a logical condition, involving the negation of a logical sub-expression.

FIG. 11 is a screen shot depicting a statement following the refinement of FIG. 10 along with the corresponding logic tree view.

FIG. 12A is a screen shot depicting an interface that allows a user to inspect the conditions associated with any variable expression in the guideline.

FIG. 12B is a screen shot depicting an interface that allows a user to inspect the recommendations associated with any condition in the guideline.

FIG. 12C is a screen shot depicting an interface that allows a user to inspect the conditions associated with any recommendation in the guideline.

FIG. 13 is a screen shot depicting a hypertext form which solicits values for variables used by the conditioning logic of a guideline.

FIG. 15 is a screen shot depicting a hypertext version of the ACP Stroke Review document in which the risk factors for stroke are discussed and the specific text describing clinical risk factors is, in an exemplary embodiment, highlighted.

The use of the same reference symbols in different drawings indicates similar or identical items.

DETAILED DESCRIPTION

Figure 1:
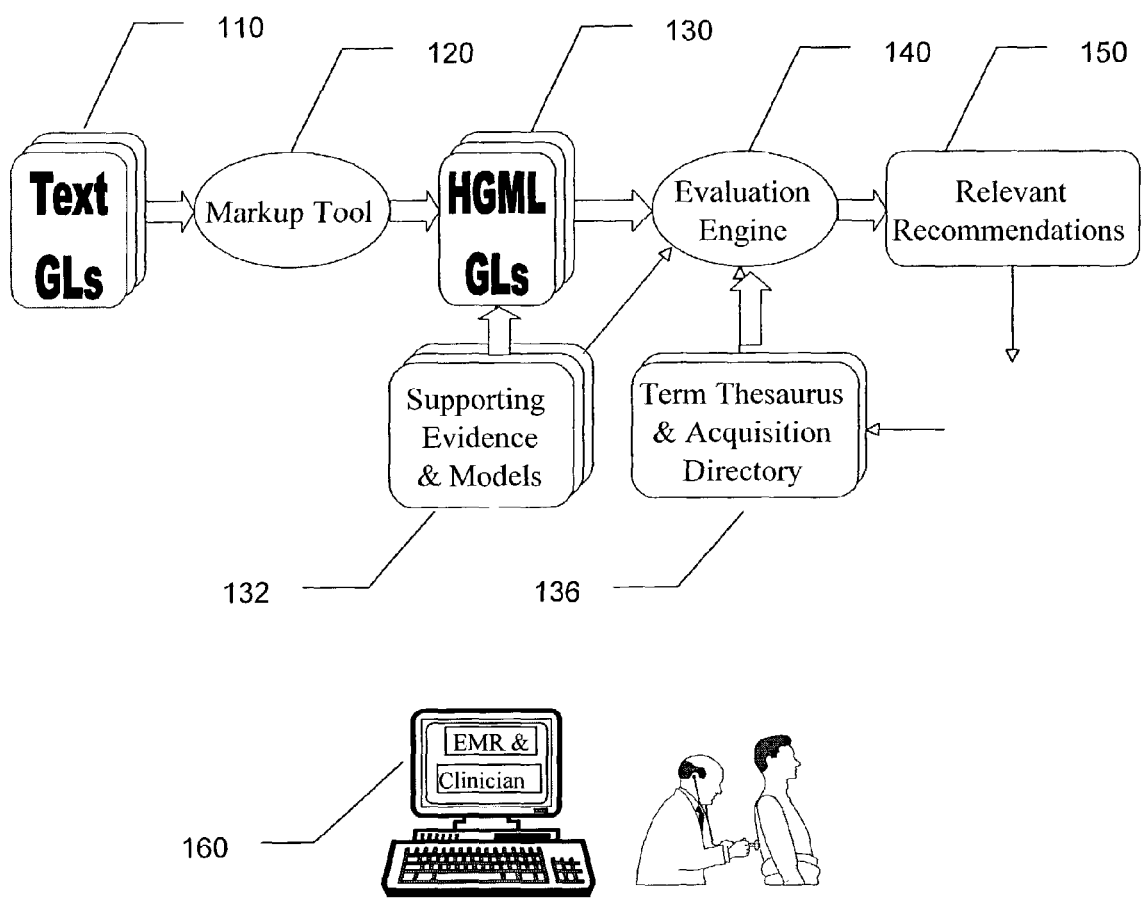
FIG. 1 is a high-level overview of the process whereby text guidelines are converted through markup to HGML which can then be evaluated in a clinical context to produce relevant recommendations in patient treatment, according to the present invention.

Existing text-based clinical practice guidelines can be difficult to put into practice. While a growing number of such documents have gained acceptance in the medical community and contain a wealth of valuable information, the time required to digest them is substantial. Furthermore, the expressive power, subtlety, and flexibility of natural language (as used in known clinical practice guidelines) poses unique challenges when designing computer tools to help in their application. At the same time, formal computer languages typically lack such expressiveness and the effort required to translate existing documents into these languages may be costly.

An effective guideline delivery system should have at least the following attributes: (1) the ability to represent a guideline in several alternative formats at differing levels of detail with ease of navigating between them; (2) the ability to produce patient-specific recommendations rapidly; and 3) ease of integration with a clinical information system. Having guidelines in such a form facilitates maintenance and the creation of tools to check consistency, improves guideline development and design, and affords a seamless link between the guideline and a wide variety of knowledge sources, from natural language descriptions to evidence-based models and simulations.

There is much to be said for the advantages of natural language, text-based guidelines. Natural languages are accepted as epistemologically adequate and as having time-tested expressive power. They allow for varying degrees of clarity and ambiguity. And while guidelines might be easier to read if they all followed the same format, different information can often be conveyed more effectively in differing formats.

One of the most effective means of facilitating the use of guidelines is to embed them into clinical information systems so that they are available immediately at the point of care. This has the advantages of automatically triggering the guideline in response to clinical circumstances, and immediately displaying appropriate action steps to the clinician. Linkage to a patient database can also save a clinician the time needed to enter data required to apply a guideline. Linkage to order entry systems can actually implement a guideline's recommendations with a simple acknowledgement by the clinician.

The systems herein disclosed may include, among other things, a toolkit to enable development of machine-readable and machine-displayed versions of a guideline from text-based documents. The initial guidelines may be in the form of physical text-based documents (hard copy) that have been scanned into machine-readable form (e.g., into ASCII or similar text coding, forming a so-called "electronic" document) using any well-known optical character recognition (OCR) technology. Alternatively, text documents already in machine-readable form, such as Microsoft Word, Adobe Portable Document Format (PDF), or ASCII text formatted documents, may be used.

Although the resultant guidelines may be used by clinicians at the point of care, the toolkit would typically be applied earlier, "offline" away from the point of care, to prepare the machine-readable (also referred to herein as "machine operable") guidelines (electronic documents, broadly) for later use by clinicians. Alternatively, the toolkit may be applied in real time, to update or enhance existing guidelines or patient-specific treatments. Accordingly, the invention is to be understood as unlimited in its point of application or context of use.

The popularity and usefulness of the World Wide Web is due, in part, by the adoption of a common, machine-readable (or "machine operable") representation for text formatting, that of the Hypertext Markup Language (HTML) and its several well-known variants. HTML allows authors to specify how text will be displayed on a variety of platforms through annotation with a set of tags. This set of tags is generally limited to those required for layout and graphic display, making pure HTML unsuitable for describing the domain specific structure and content of documents. The World Wide Web Consortium (W3C) [7], the body responsible for publishing standards for the World Wide Web, has attempted to address these limitations by developing a new standard for document markup, the Extensible Markup Language (XML). XML allows document authors to extend the set of available tags to include markup of document content and other relevant data into machine-operable form. There also exist libraries and tools for parsing documents in XML.

As the XML standard is rapidly becoming dominant, the present system may use an XML-compliant markup language, referred to herein as the Hypertext Guideline Markup Language (HGML). This markup language, although flexible and adaptable to any electronic document scheme, may be specifically tailored to the requirements of conditional guideline delivery and presentation.

Although a hypertext-based clinical practice guideline processing and display system, and in particular an HGML-based system, is described, those skilled in the art will realize that electronic document processing and systems for graphical display of conditions other than a those specific to clinical practice guidelines and/or HGML can be used. For example, electronic documents containing graphical data, audio, video, photographs, and/or pre-defined hypertext are also useable inputs to the disclosed process. Furthermore, tagging or annotation systems other than HGML may also be employed to show conditional relationships. Accordingly, the present system and method are not limited to any particular type of electronic document input, markup language, or application of a hypertext-based markup processing and/or display system.

Markup Process

The system allows a guideline in its original text form to be annotated with markup tags (i.e., "tagged") to produce a structured version in which the input parameters required to apply the guideline (i.e., conditions) are explicitly specified. In this format, the guideline may be electronically displayed as originally published or in multiple additional views. Preservation of the original text of a guideline may be important because it can allow a clinician to see the guideline as it was originally published. The original text may impart subtleties not captured in the guideline logic and provides a reality check for the advice offered by the guideline presentation system.

FIG. 1 is a high-level overview of a procedure that transforms text-based guidelines (text GLs) into HGML guidelines for use in patient treatment. The original text guidelines are received 110 and processed with the markup tools 120 resulting 130 in HGML guidelines (GLs). The resulting HGML GLs are supported by and provide cross-reference to documentary evidence 132 and a thesaurus and directory 136.

Evaluation Engine 140 optionally further processes HGML GLs 130 to produce one or more recommendations for treatment 150, which may then be displayed 160 to a treating clinician, technician, or other professional.

In one embodiment of the system, annotation may be performed by an operator using an HGML editor tool (in step 120) specifically adapted to aid in the tagging of guideline text according to the required HGML syntax and particular vocabulary. Creation of such a tool using, for example, presently available text editors and macro tools (e.g., Microsoft Word, VI, or TECO) is well within the skill of an ordinary practitioner.

Figure 2:
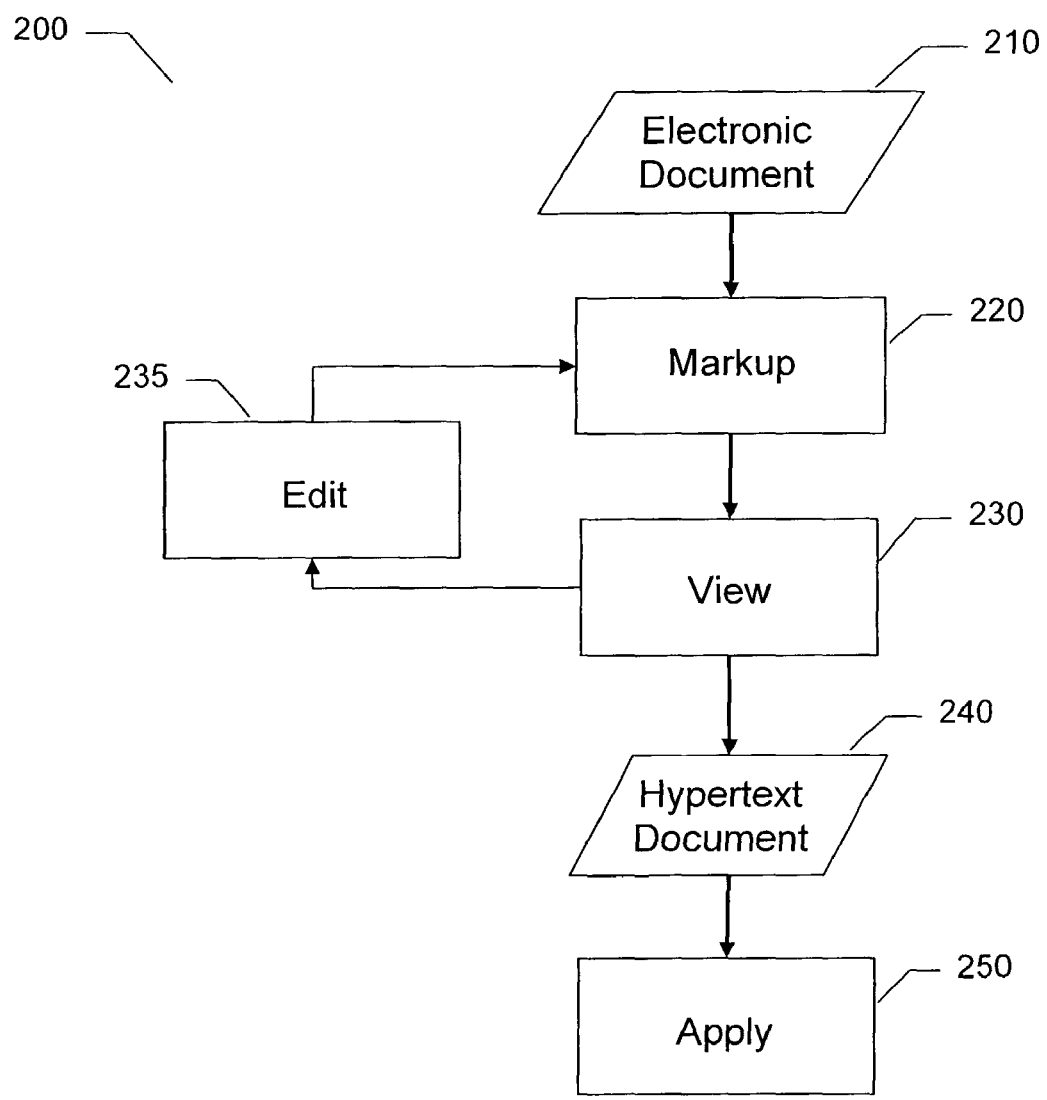
FIG. 2 is a process flowchart of the parsing, tagging, and distributing steps, according to one embodiment of the present invention.

FIG. 2 is a more detailed process flowchart of the markup and application process 200. An electronic document, described above, is received in stage 210 and the markup process begins in stage 220. Markup consists of reading (or parsing, if done with the aid of a computer) the contents of the electronic document. The input document contains a series of statements and may also contain graphics or other multimedia objects to illustrate or expand upon its statements. These statements may contain one or more of the following elements:

Links to other statements or objects in the document;
Conditions; or
Recommendations on actions to take if certain conditions are met or not met.
Links may consist of IF . . . THEN logical relationships between statements of analogous one to one or one to many branch/control statements. One of ordinary skill in the programming arts will readily see that the CASE or ON . . . GOTO constructs fall into this class.

Figure 10:
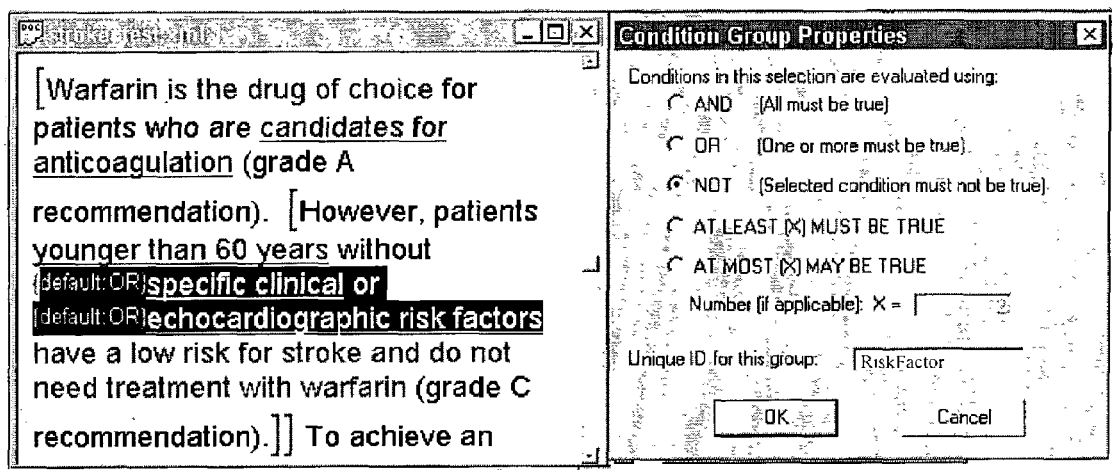

Conditions consist of variables (i.e., parameters denoting certain characteristics of a patient or situation) and logical operators. A variable is a potential state of an object. For example, in the healthcare context, a potential state (condition variable) of a patient may be "younger than 60 years old" or "body temperature greater than 100 degrees Fahrenheit." Logical operators relate conditions to each other in the Boolean sense; exemplar logicals are OR, AND, NOT. The right side dialog box of FIG. 10 illustrates some of the possible choices.

Markup 220 continues until all salient or relevant statements and/or objects within electronic document 210 have been identified and tagged according to the syntax presented below. The concepts of relevance and salience here pertain to the applicability of the statements to the purpose of the guideline or rulebook being processed. For example, if the guideline concerns how to repair diesel engine controls, cautionary statements on the location of hot surfaces are relevant, but marketing puffery on the superior characteristics of a particular aspect of the machine are not. The markup process thus filters out irrelevant, redundant, and unimportant material.

View stage 230 follows after, or optionally during, markup stage 220. Here, the markups and condition/recommendation relationships are graphically displayed on the computer workstation screen, to show the person supervising or performing the markup process the derived flow of the guideline. This flow, consisting of the possible branches and resulting recommendations that arise from the presence of absence of certain conditions, may, in some embodiments, be illustrated by the use of color or grayscale highlighting or graphical symbology. Exemplary embodiments are illustrated below in the discussion of FIGS. 9A through 11.

Should changes or adjustments in the markup be necessary, stage 235 is provided to make and save such changes prior to review. At the end of a cycle of markup and view, hypertext document 240 results. Hypertext document 240, the resulting output of the markup/view/edit steps 220, 230, 235, contains all necessary links and conditions to rapidly apply the guideline. It can thus be applied (stage 230) directly by the practitioner or technician to the problem or diagnosis task at hand.

Application stage 230 consists of comparing measured or observed characteristics of the problem to be solved (e.g., the symptoms and vital signs of a patient to be treated or the facts of a particular fault or error situation) to the predicates of the logical tests presented in the hypertext guideline. One exemplary embodiment of the present invention provides a hand-held computer with the hypertext guideline (HG) embedded therein to a clinician. The clinician, upon examining the patient, can then refer to the HG and follow the logical path indicated by the patient's particular condition toward a recommended treatment.

Hypertext document 240 may also be distributed to users by various means well-known in the art, such as (but not limited to) electronic distribution over the Internet, an internal network, an external private or semi-private network (e.g., an extranet or virtual private network [VPN]), or a combination of the above (also referred to as a "network of networks"). Hand distribution of the hypertext guidelines, as by distribution of CD-ROM, floppy disk, flash memory card, or any other computer-readable medium containing a representation of he hypertext document, are also within the compass of the present disclosure. Accordingly, the present disclosure is not limited by the method of distribution of the hypertext guideline.

As a further aid to understanding, and as one example of a suitable HGML editor for use in the present invention, Appendix B (on CD-ROM) presents the source code listing for a representative HGML editor, GLEDITOR.EXE. Appendix A lists the program files presented in Appendix B. Both Appendices A and B are hereby incorporated herein by reference in their entireties.

Although the HGML editor GLEDITOR is described, those of ordinary skill in the programming arts are able to produce equivalent HGML editors without undue experimentation, based on this disclosure and facts and techniques known to such practitioners. Accordingly, the invention is not limited to any particular HGML editor or implementation.

Identifying situations where potential conflict or ambiguity among components of a guideline can arise is essential to ensure accuracy in clinical application. The point-and-click interface provided here for annotating the guideline in HGML helps in identifying key components and verifying the accuracy and efficacy of the machine-operable guideline. Conditions and recommendation may be refined interactively by modifications to the logical operators and variables identified during the annotation process. Consistency for deliberately ambiguous sections of guidelines may not be easy to achieve, requiring sophistication on the part of the annotator, who must distinguish and choose among different levels of granularity and detail in the definition of the variables and their attributes. However, the markup tool facilitates this process. The relations between recommendations can also become clearer when displayed (viewed) in alternative formats, thus making it easier for the annotator to identify and clarify conditions. Such tools may also improve the development of future guidelines.

Once conditions are specified in a document, feedback may be automatically generated to indicate the overlap or coverage in terms of the space of possible conditions. This may be accomplished in a straightforward fashion by comparing the conditions for each set of recommendations to indicate overlap, where any would be simultaneously satisfy some set of conditions. Further analysis of the specified conditions allows for the indication of gaps in the coverage, where no recommendation is specified to satisfy potential queries composed of the variables specified in the guideline.

Alternate methods and additional enhancements of the inventive system are also possible and may be included in some embodiments. Automatic methods for decomposing guidelines into logical conditions and recommendations and tools for analyzing the requirements for mapping them into rule-based formats are two such enhancements. Such tools are useful for integrating guidelines with data from electronic medical records and clinical information systems, which would have at least two important effects. First, they would direct data gathering, retrieving data automatically from an electronic system or prompting the clinician if data were not available. Second, they would result in time savings that would more than offset any additional time required to apply the guideline.

The HGML system may thus be, in some embodiments, a building-block or component of a system for developing guidelines that are interpretable by machine.

The HGML system described herein and its various alternate embodiments may allow existing guidelines to be transformed with minimal additional expertise into a representation which makes more efficient delivery possible without compromising their content and expressiveness. This facilitates the increased and more effective use of such guidelines.

Hypertext Guideline Markup Language Syntax and Grammar

A guideline may be seen as a document containing various segments of information or statements, each which may serve different purposes. The most conceptually general segment is the informational statement, which often provides background description for a particular disease (in the medical guideline context), or contains specific recommendations. Of particular interest in defining or describing a guideline are identifying recommendations and the conditions under which they apply, referred to herein as the "conditioned recommendations," that make the guideline useful.

Conditional recommendations in medical guidelines are typically expressed in terms of patient characteristics, but may also be described in terms of environmental constraints, such as availability of resources. These components of conditions are collectively referred to as variables or parameters. Each of the elements (statements, conditions, recommendations, and variables) is identified within existing documents in such a way that they can be logically related to one another through standard Boolean operators. Through these elements, the system presently disclosed captures important aspects of the natural language needed to realize machine-operability, such as retrieving the recommendations which apply under certain conditions.

Based on this view of guideline structure, the following basic set of document annotation tags, which together define the HGML grammar, are provided. As with existing markup schemes, each tag consists of a keyword enclosed in angle brackets. Tags typically form begin-end pairs, the end tag identified by a slash, which surround the original text. Additional attributes may appear within the angle brackets of a begin tag, denoted below within square brackets when they are optional. When viewed by a browser or markup tool, the tags are generally hidden, though there presence of operation may be denoted with the use of color or grey-scale modification of the display. The tools also allow passages of various types to be displayed in different formats.

The use and grammar of hypertext markup languages generally is readily appreciated by those of ordinary skill in the art, as are the myriad of variations in both syntax and grammar. Accordingly, the inventive system is not limited to the single grammar and syntax described herein, but may be practiced in a variety of forms.

Use of each tag will be illustrated with a marked-up passage from the American College of Physicians Guideline for Medical Treatment of Stroke Prevention [8], to wit:

<statement><recommendation><keyword>Aspirin</keyword> is effective in reducing the risk for stroke </recommendation><condition > in patients with <condition><variable>TIA</variable></condition> and <condition>minor stroke </condition></condition></statement> where the tags are defined as follows:

<recommendation> . . . </recommendation> surrounds a block of text which can be considered a unit of recommendation <condition [id] [operator][expression]> . . . </condition> identifies the portion of text which may condition a particular recommendation. Attributes may specify a unique identifier and/or an operator. When condition tags surround other condition blocks, the operator is used to define the Boolean relations between those nested conditions. By nesting conditions with a full complement of logical operators, the HGML can express a full range of logical expressions. If no operator is specified, the default Boolean operator "OR" will make the expression true if any one of the nested conditions is true. The [expression] attribute allows an infix conditional expression to be specified to override the operations and variables contained within the condition tags, in case the logic is cumbersome to translate from natural language.

<statement> . . . </statement> surrounds a block of text which serves some common purpose. One use of the "statement" is to bind conditions to recommendations or sub-statements. If both a recommendation and condition appear in a statement, the recommendation is returned in response to a given query on that condition. Statements may also surround other statements which share a condition. Unless specified otherwise, they may be assumed to form a conjunction with any conditions of the sub-statement. Informational statements need not contain conditions or recommendations; in that case, they may be referred to by keywords.

<keyword> . . . </keyword> allows for the identification of an expression which may be associated with the statement or recommendation in which it occurs. For example, the appearance of a keyword for a particular treatment in a recommendation may allow it to be associated with some informational statement about that treatment.

<variable> . . . </variable> identifies a portion of text which can be associated with a particular patient characteristic, variable, or parameter. This allows more detail to be identified within conditions and may allow for the automated application of the guideline to particular patients.

In the following example, the inner conditions consist solely of variables, which may be assumed to take on Boolean truth-values:

<condition> in patients with <condition><variable>TIA </variable></condition> and <condition><variable> minor stroke </variable></condition></condition>

In the next example, stenosis is expressed as a continuous variable while the relational operator specifies a decision point on that variable. The rule is that conditions bind relations to variables as statements bind conditions to recommendations. <condition> On average, patients with <relation operator="less-than" value="30%"> less than 30% </relation><variable> stenosis</variable></condition>

Relational operators may also be used for categorical variables, such as in differentiating between major or minor stroke. Here, the syntax is: <relation operator="equal-to" [value="value"] [min="value"] [max="value"]> . . . </relation> provides a machine-readable representation for text which serves the logical function of a relational operator such as "equal-to."

In natural language, one sometimes finds statements that refer to conditions which do not appear in adjacent text or are implicit, requiring insertion by way of additional annotation. To facilitate this, the reference tag, <reference id/>, which has no associated end tag, may be used in place of a condition to cite a condition appearing elsewhere in the document by referring to the unique identifier specified with the associated condition tag. Thus, the stroke statement shown above may be marked up alternatively with a reference tag as follows:

<statement><recommendation> Aspirin is effective in reducing the risk for stroke </recommendation> <reference "condition001"/></statement><condition id="condition001">in patients with <condition> TIA</condition> and <condition><variable> minor stroke </variable></condition></condition>

Additional tags may be introduced to facilitate inferences about the guideline content, identifying levels of evidence for recommendations, and providing links to other documents or even theoretic decision models and simulations. However, the relatively simple set of tags outlined above forms an initial basis for identifying the elements critical in guideline application.

Markup Tools

Figure 3:
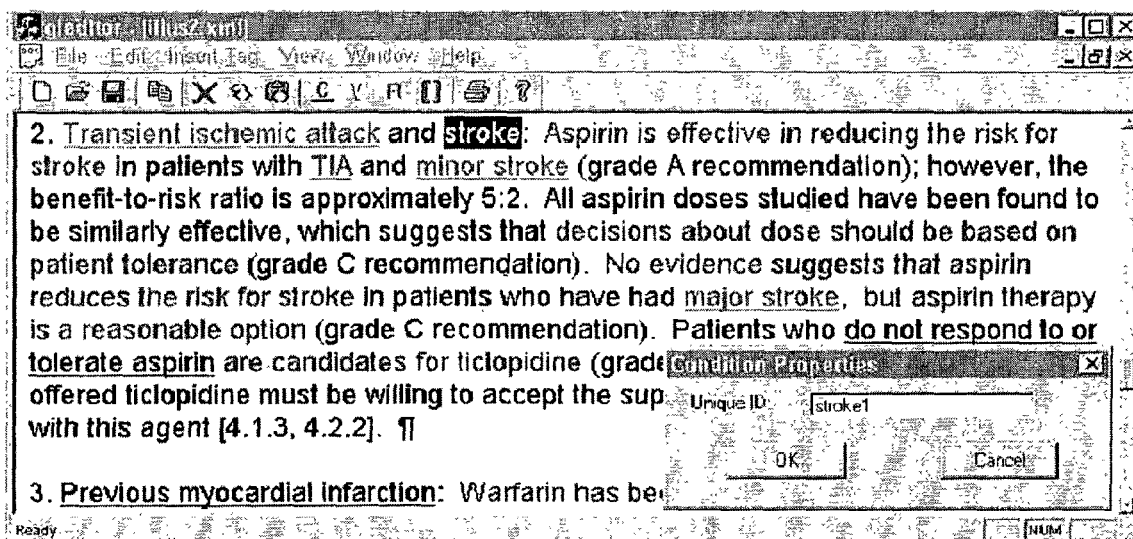
FIG. 3 is a display capture (screen shot) of an HGML editor according to one embodiment of the invention, showing a representative tagged guideline.

FIG. 3 shows a screenshot from one embodiment of a markup tool for practicing the invention. This display contains a section of the ACP stroke prevention guideline [8] discussed above. The text describing "stroke" is highlighted, and the "C" button, or equivalent menu option, is selected in order to identify it as a condition through the insertion of embedded mark-up tags. A pop-up window labeled "Condition Properties" allows the text "stroke" to be associated with a unique identifier.

Previously identified conditions/variables appearing underlined are "Transient ischemic attack," "TIA," "minor stroke," "major stroke," "do not respond to or tolerate aspirin." Previously identified recommendations appear in grey (or a colored font): "Aspirin is effective in reducing the risk for stroke", "No evidence suggests that aspirin reduces the risk for stroke", "aspirin therapy is a reasonable option", and "candidates for ticlopidine."

The elements in this window have been identified and tagged using the markup tool. The tool uses a unique color to display condition, recommendation, variable, and relation tags, which all appear here in differing gray scale. In addition, condition tags are underlined so that the viewer can easily identify elements that are contained within them.

Figure 4:
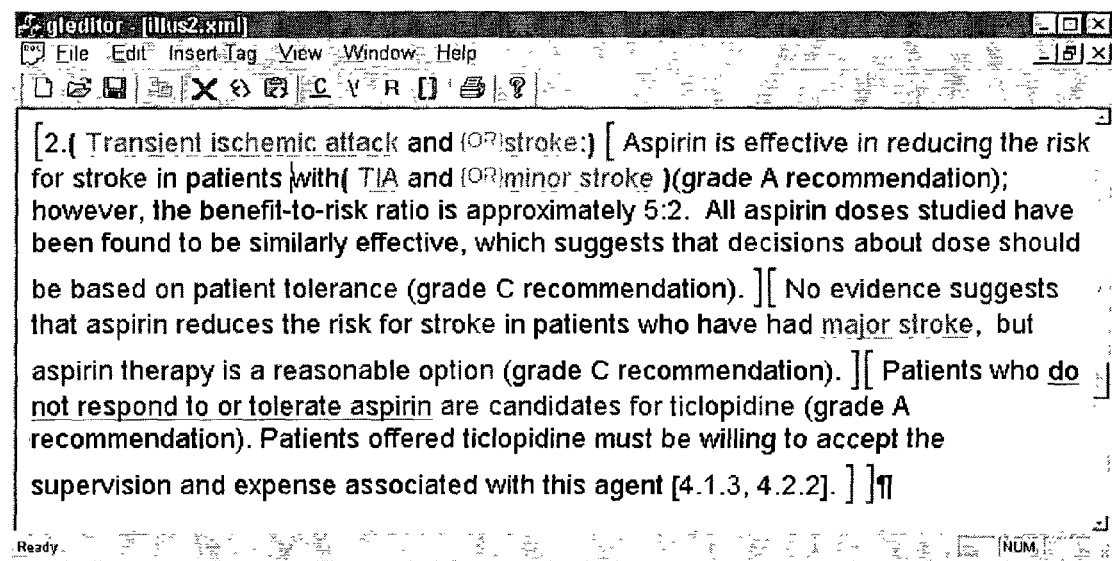
FIG. 4 is another screen shot of the guideline depicted in FIG. 3, illustrating logical relationships.

FIG. 4 shows the same section in which logical operators have been included. The conditions "TIA" and "minor stroke" appear in separate boxes that are linked to an oval with the logical operator "OR". This oval is linked, in turn, to a box containing the recommendation "Aspirin is effective in reducing the risk for stroke". Here, tags which surround other tags to define their logical relationships to one another are represented by brackets or parentheses: statement blocks are surrounded by large square brackets ([ ]) and condition tags that are used to group sub-conditions are indicated by parentheses, while Boolean operators contained in the surrounding conditions are specified in superscripted curly-brackets (for instance, "$^{\{OR\}}$"). Note that the phrase "TIA and minor stroke" (in this context) refers to patients with either TIA or stroke; the person doing the markup be sensitive to this case or situation.

The system and, in particular, its graphic display tools, may provide more than one view to the person doing the markup in order to improve the flexibility and ultimate ease of use of the guideline data. Thus, in some embodiments, the text window alternatively allows one to view nested statements in a more structured form by indenting them relative to each other. Additionally, the text window may provide the option to view either the original language of the document or the "marked-up" logic embedded in the variable and relation tags. For instance, the user may choose to view "patients older than 60" as "age >60."

Figure 5:
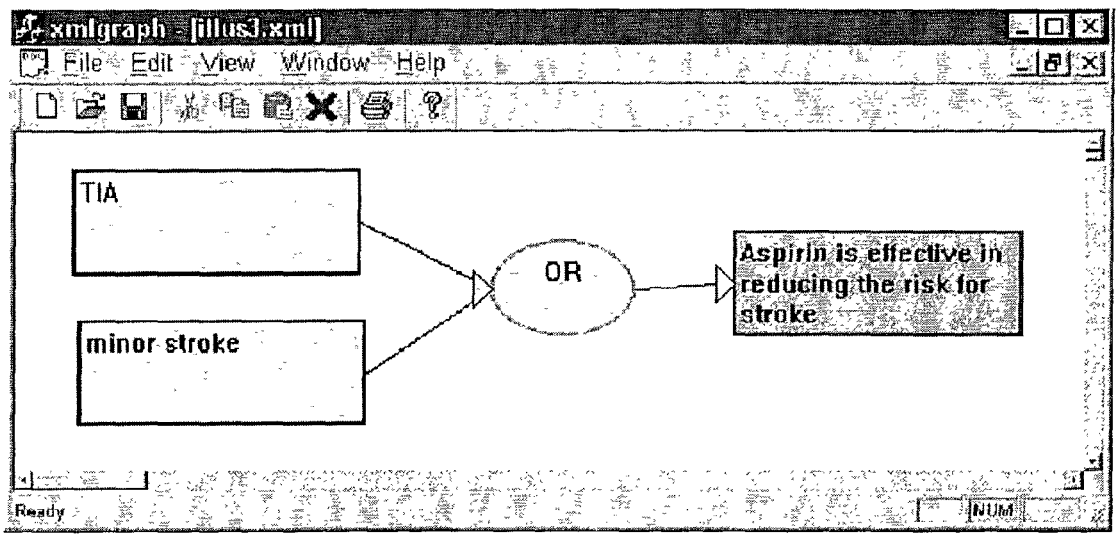
FIG. 5 is a screen shot of the display of a graphical tool for associating conditions and recommendations, according to one embodiment of the invention.

Since translation of conditioning expressions into their logical counterparts can require great care, the integrated graphical tool may allow the user to clarify complicated logical statements by manipulating operators, conditions, and recommendations in a spatial two-dimensional (2D) representation. For example, the view shown in FIG. 5 allows one to associate two conditions by dragging one onto the other and then using a dialog box to specify a Boolean operator. In that figure, rectangles labeled "TIA" and "minor stroke" represent Boolean (true or false) conditional variables and are connected by arrows to an oval labeled "OR," representing the truth value of their disjunction. This oval is connected by an arrow to a highlighted rectangle representing the recommendation "Aspirin is effective in reduction the risk for stroke." This indicates that the recommendation is deemed relevant when either TIA or minor stroke are true.

Figure 6:
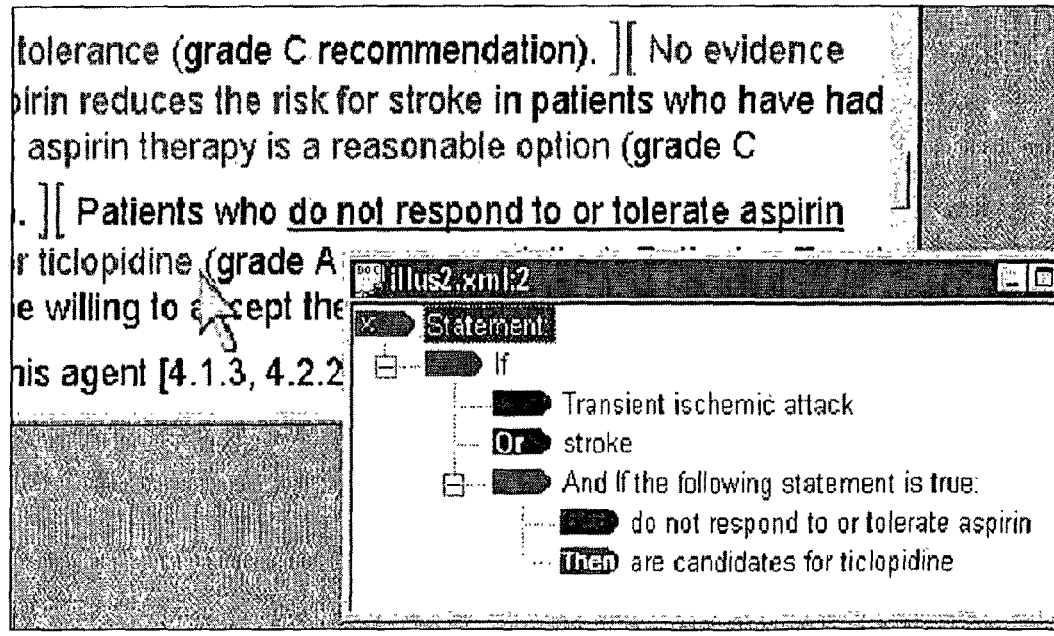
FIG. 6 is a screen shot depicting a tree display of the logical statements and sub-statements defined to evaluate a condition.

In addition, the tool may provide a "tree view" (shown in FIG. 6) that illustrates the steps necessary to evaluate the conditions that lead to a particular recommendation. This tree is designed to resemble an English-language statement articulating the relationship between elements in a particular path through the guideline. Thus, an excerpt of a marked-up guideline is shown, superimposed by a window displaying the corresponding logic of the statement represented so that the IF-THEN rule appears in a tree format.

FIGS. 7 through 16 illustrate the use of the GLEDITOR. EXE software tool in annotating an electronic text guideline in the health-care context, in accordance with one embodiment of the present invention. As discussed above, the present disclosure is not limited in application to the health-care field. Accordingly, although the following figures provide a health-care example, they are not to be construed as limiting the scope of applicability of this method and system.

Figure 7:
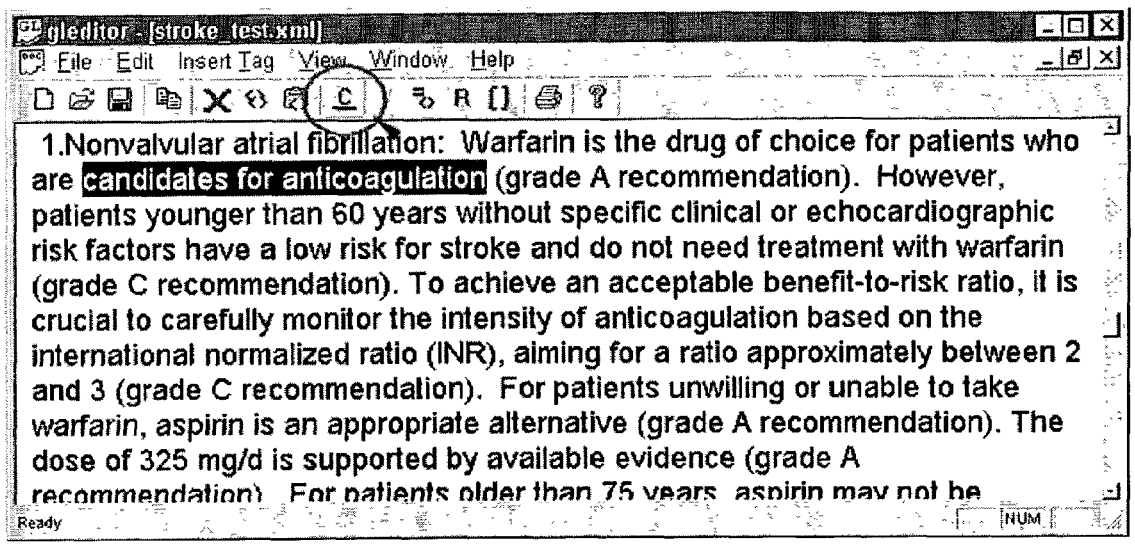

FIG. 7 is a screen shot depicting the identification of a condition, by highlighting the desired text and pressing the "condition" button. The text describing "candidates for anticoagulation" is highlighted, and the "C" button, or equivalent menu option, is selected in order to identify it as a condition through the insertion of embedded mark-up tags.

Figure 8:
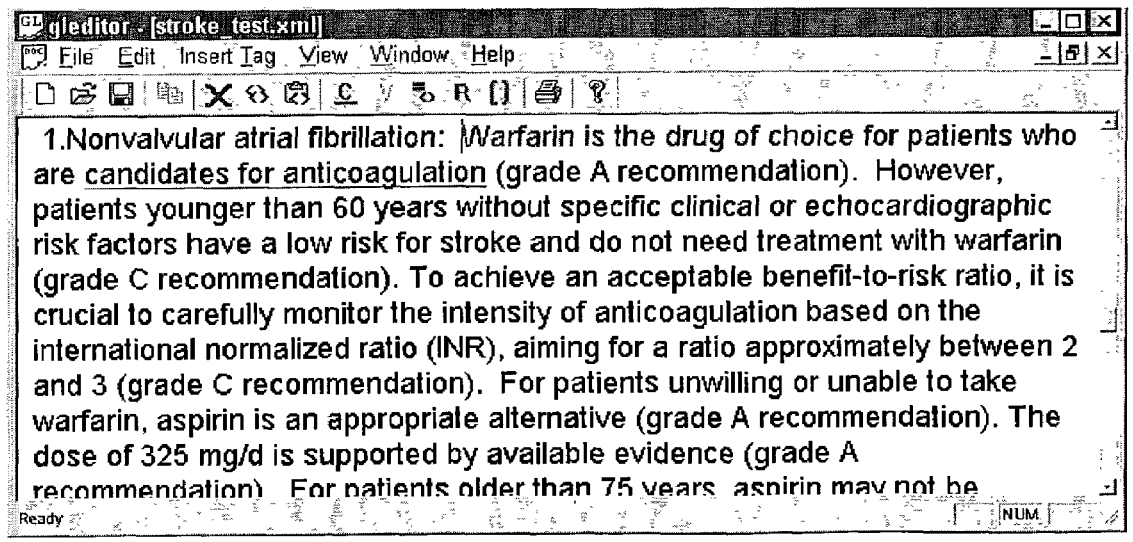

FIG. 8 is a screen shot depicting the guideline text after a condition (underlined) and recommendation (grey) have been identified. The expression "Warfarin is the drug of choice" is identified as a recommendation (appearing in grey) through its selection and the pressing of the "R" button or equivalent menu option. The associated condition "candidates for anticoagulation" appears underlined in this exemplary embodiment.

Figure 9A:
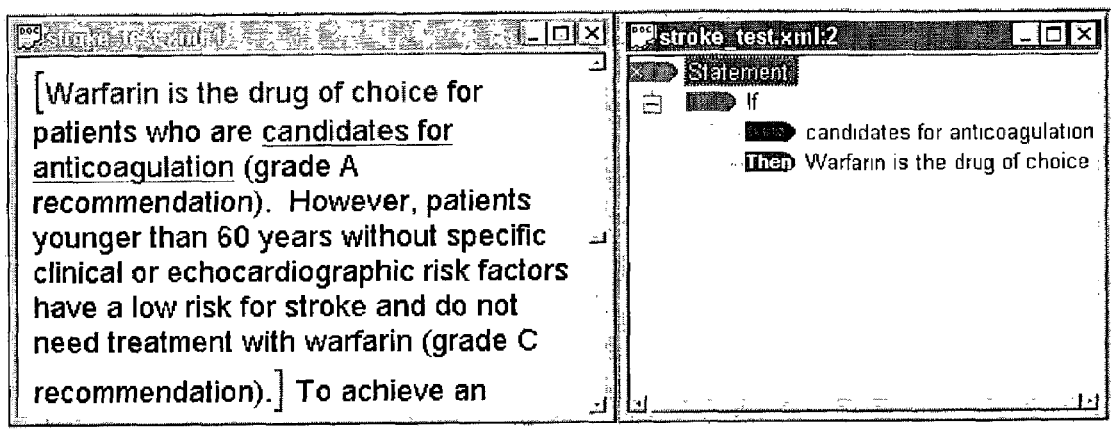
FIG. 9A is a screen shot depicting a statement including a condition and recommendation along with the corresponding logic tree view.

FIG. 9A is a screen shot depicting a statement including a condition and recommendation along with the corresponding logic view. Square brackets around the paragraph in the left panel delimit the statement containing a condition and recommendation. The right panel displays these elements in a "logic tree" format.

Figure 9B:
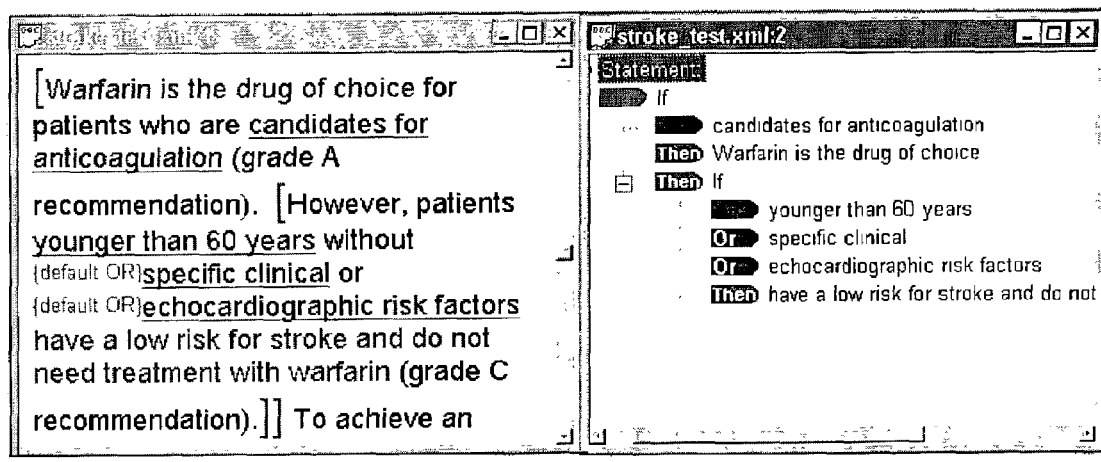
FIG. 9B is a screen shot depicting a statement including a sub-statement along with the corresponding logic tree view.

FIG. 9B is a screen shot depicting a statement including a conditioned sub-statement along with the corresponding logic view. The paragraph of FIG. 9A appears in the left panel with an additional (bracketed) sub-statement identified, including additional sub-conditions (underlined), and with annotations indicating that these conditions will be logically ORed, by default, to determine whether the recommendation "have a low risk for stroke" will be relevant. The right panel displays the corresponding logic tree view, which may be interpreted as IF-THEN relevancy rules.

FIG. 10 is a screen shot depicting the refinement of a logical condition, involving the negation of a logical sub-expression. In the left panel, the conditional expressions "younger than 60 years . . . specific clinical . . . echocardiographic risk factors" has been selected and appear highlighted. The default logical connectives of "OR" are indicated by the annotations "{default:OR}". To represent the word "without," the negation of the latter two conditions is achieved through their selection and the choice of the condition properties button (not shown) or menu option. This results in the dialog shown in the right panel which allows the logical operator "NOT" to be applied to this group of conditions.

Figure 11:
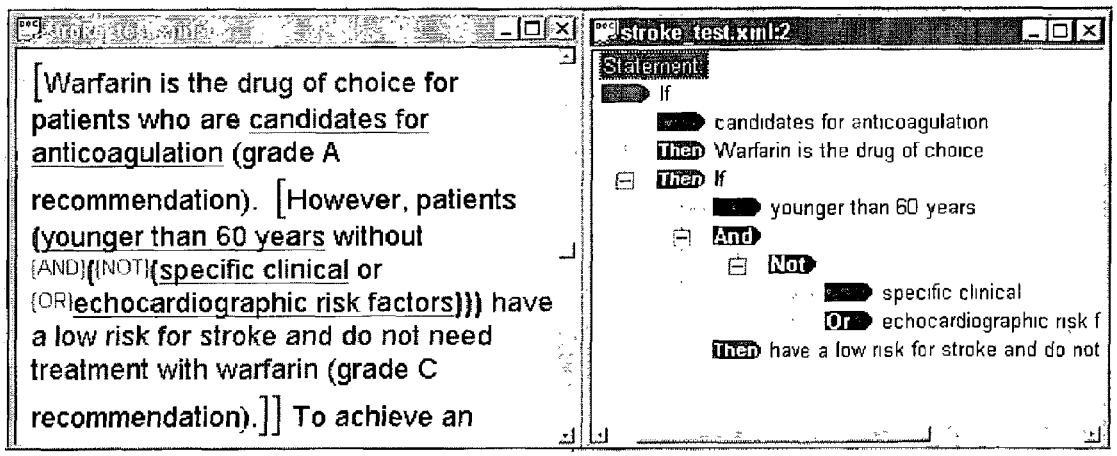

FIG. 11 is a screen shot depicting a statement following the refinement of FIG. 10 along with the corresponding logic view. The left panel shows the text of FIGS. 9A through 10 after the markup is complete. The right panel shows a corresponding tree logic view.

FIG. 12A is a screen shot depicting an interface that allows a user to inspect the conditions associated with any variable in the guideline. The left panel contains a list of all expressions identified as variables in the guideline, of which "age" is highlighted. The right panel displays the condition expressions associated with "age" in the document along with the relational constraints. "For patients older than 75 years" is associated with the relation that "age" be "<75" and "younger than 60 years" (appearing twice in the guideline) is associated with the relation that "age" be "<60."

FIG. 12B is a screen shot depicting an interface that allows a user to inspect the recommendations associated with any condition in the guideline. The left panel contains a list of all expressions identified as conditions in the guideline, in which "stroke" is highlighted. Note that this includes all variables as well, which are treated as atomic conditions. The right panel lists the six recommendations which are associated with "stroke."

FIG. 12C is a screen shot depicting an interface that allows a user to inspect the conditions associated with any recommendation in the guideline. The left panel lists all the recommendations in the guideline, of which "aspirin is an appropriate alternative (grade A recomm . . . )" is highlighted. The right panel lists the two conditions related to this recommendation, "Nonvalvular atrial fibrillation" and "unwilling or unable to take Warfarin."

FIG. 13 is a screen shot depicting a hypertext form which solicits values for variables used by the conditioning logic of a guideline. This figure shows a web page containing a form that associates variables with values. For example "Nonvalvular atrial fibrillation" is "TRUE", "TIA" is "TRUE" and "age" is "70." These variables, or patient characteristics, are considered relevant to the application of the "Stroke" guideline.

Figure 14A:
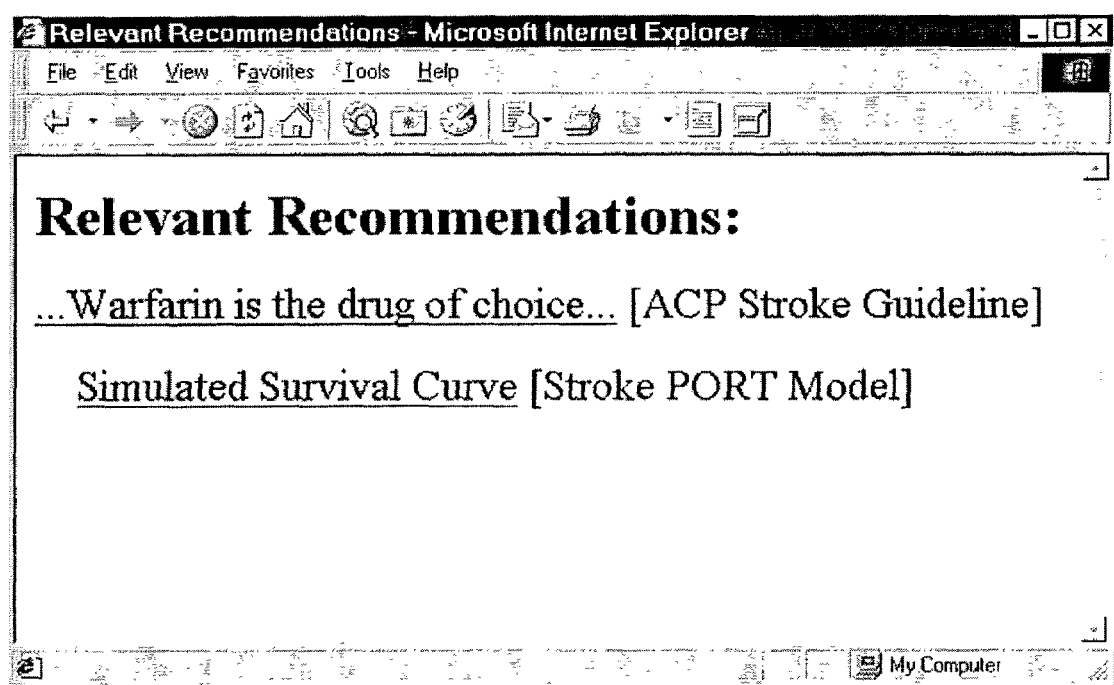
FIG. 14A is a screen shot depicting a list of hypertext links to information that is relevant to the application of the "Stroke" guideline.

FIG. 14A is a screen shot depicting a list of hypertext links to information that is relevant to a specific query. This figure shows a web page containing the "Relevant Recommendations" for a specific query of the available stroke guideline and model. "Warfarin is the drug of choice" appears as a hyperlink into the ACP Stroke Guideline, while "Simulated Survival Curve" is a hyperlink to custom results generated from the "Stroke PORT Model."

Figure 14B:
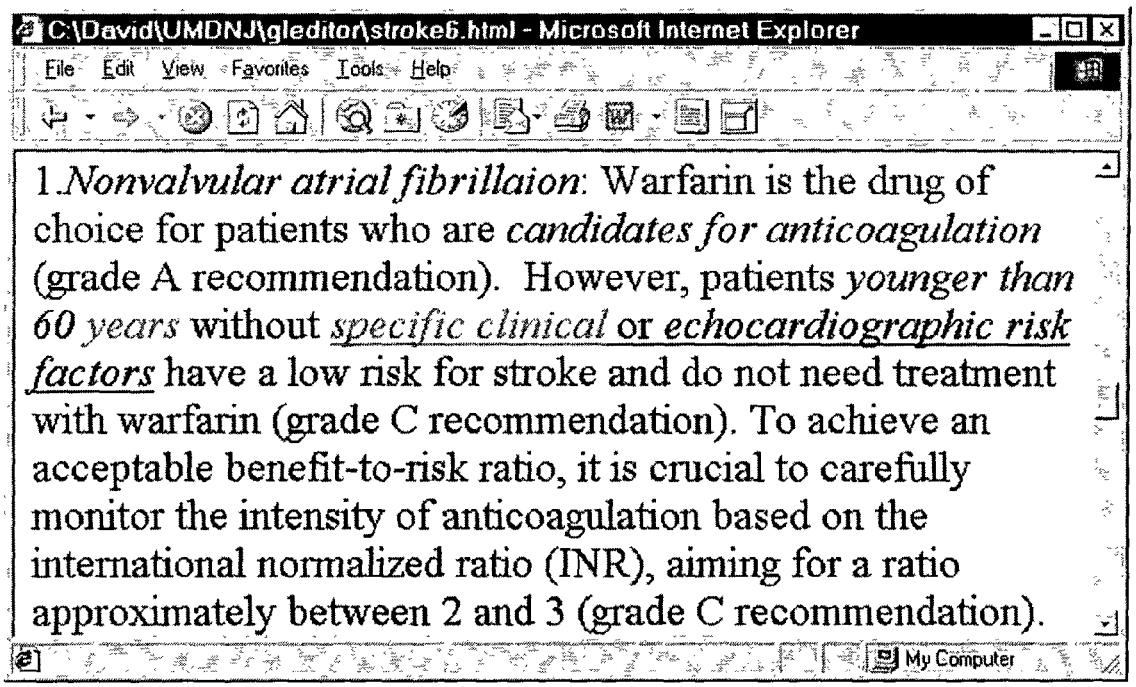
FIG. 14B is a screen shot depicting a section of a guideline relevant to a specify query, available via a hyperlink such as that shown in FIG. 14A. Also shown are hyperlinks to terms defined elsewhere in the document.

FIG. 14B is a screen shot depicting a section of a guideline relevant to a specify query, available via a hyperlink such as that show in FIG. 14A. A web browser displays a hypertext version of the ACP Stroke Guideline in which recommendations involving the drug "Warfarin" are discussed for patients with "Nonvalvular atrial fibrillation." The associated conditions, variables and recommendations appear in different colored fonts (blue/grey italics, yellow/grey italics, and red/grey, respectively), while underlined text involving "risk factors" indicates a hyperlink to additional information.

Figure 15:
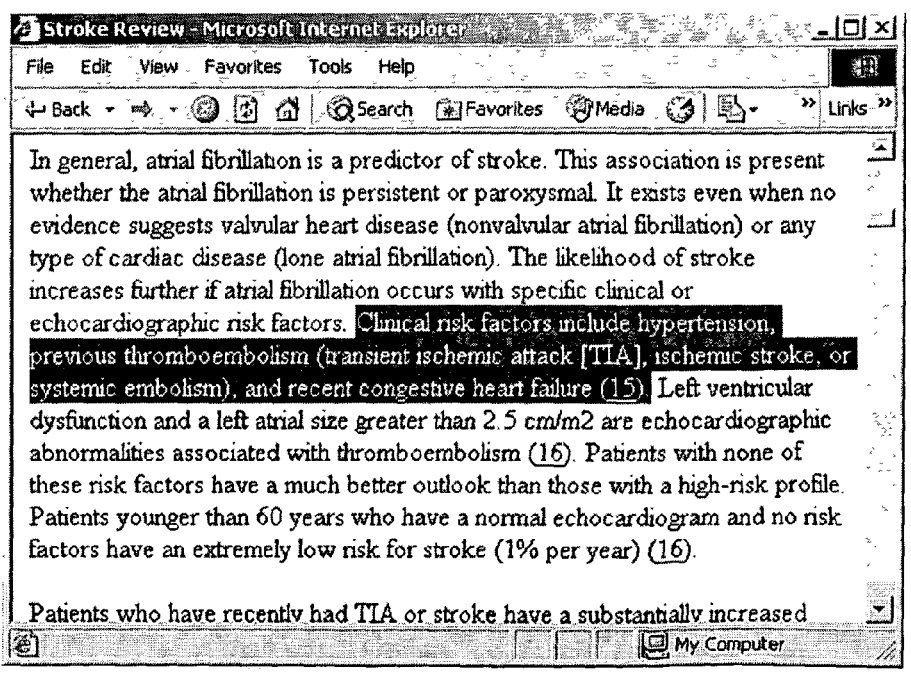

FIG. 15 is a screen shot of a web browser displaying a hypertext version of the ACP Stroke Review document in which the risk factors for stroke are discussed. The specific text describing clinical risk factors is appears highlighted.

Figure 16A:
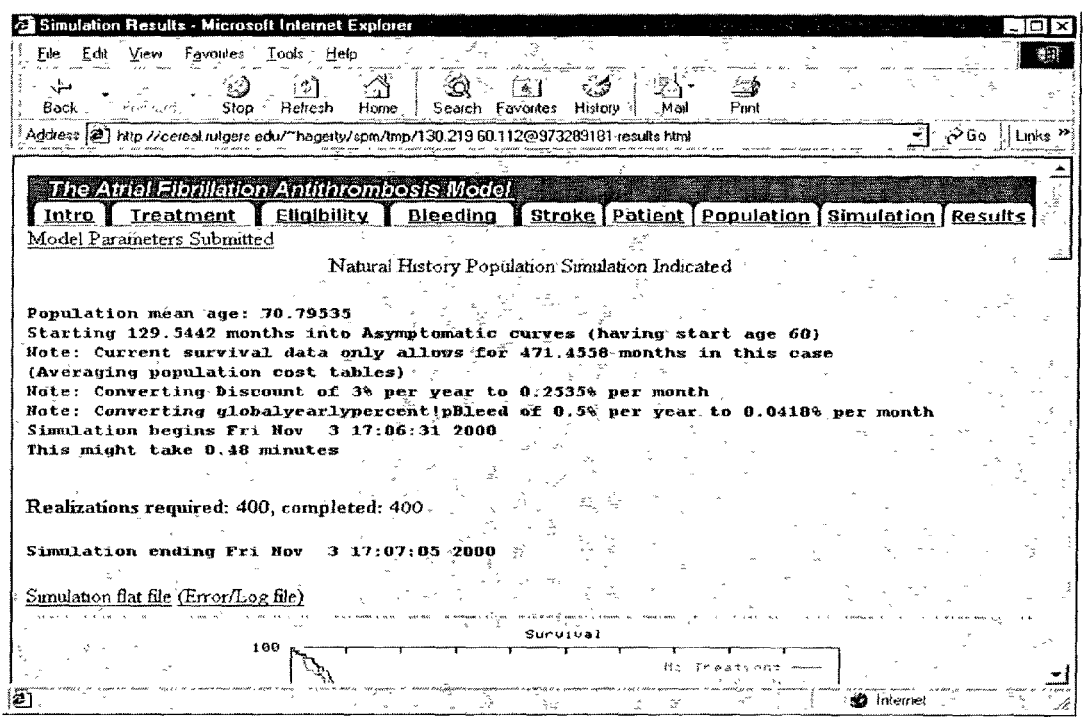
FIG. 16A is a screen shot depicting the results of a simulation performed in response to a specific query, available via a hyperlink such as appearing in FIG. 14A.
Figure 16B:
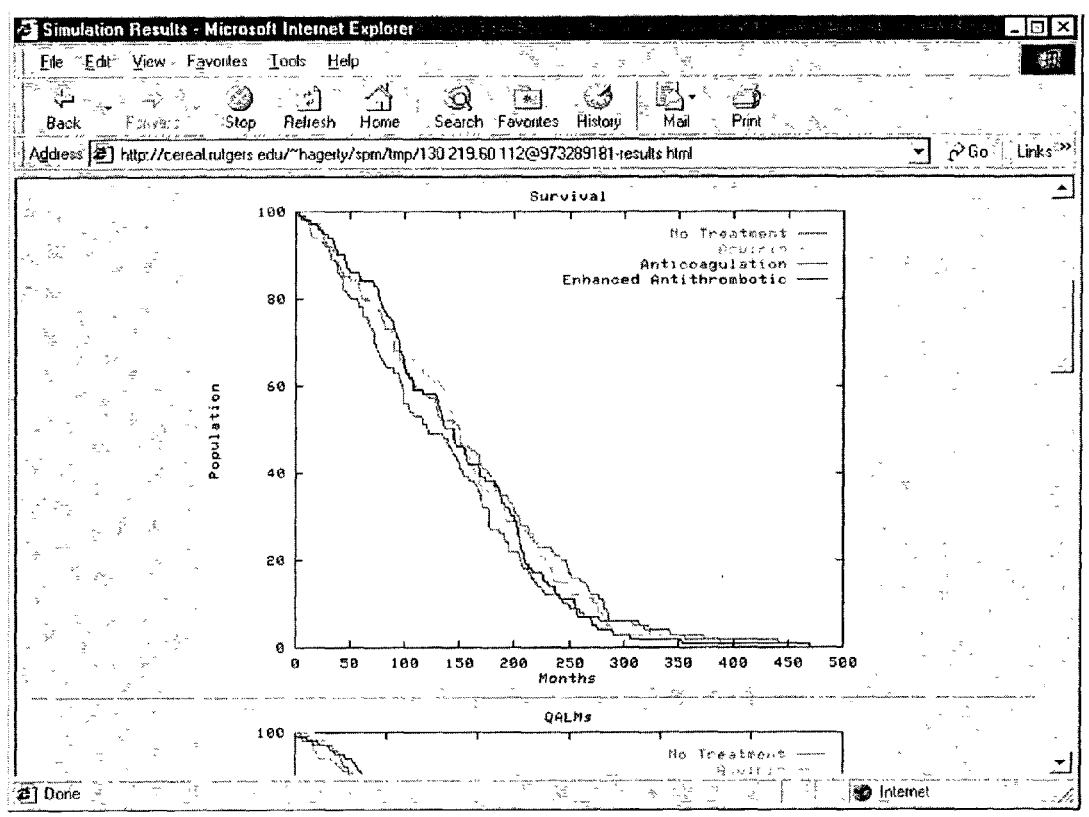
FIG. 16B is a screen shot depicting the continued results of a simulation in response to a specific query, including a generated survival curve.

FIG. 16A is a screen shot depicting the results of a simulation performed in response to a specific query, available via a hyperlink such as appearing in FIG. 14A. FIG. 16B is a screen shot depicting a generated survival curve resulting from such a query; likewise FIG. 16C shows a resulting a cost effectivity analysis.

Figure 16C:
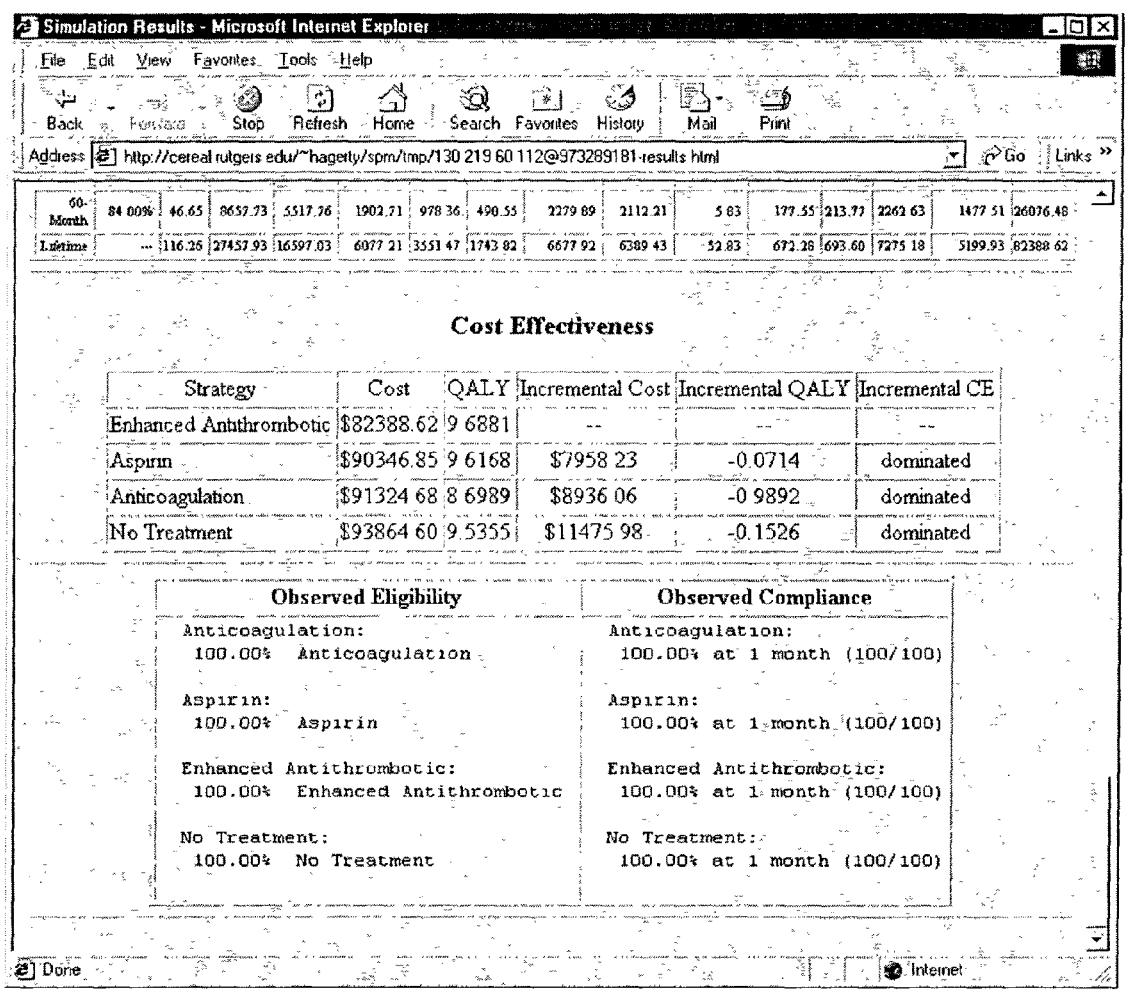
FIG. 16C is a screen shot depicting the continued results of a simulation in response to a specific query, including a cost effective analysis.

Annotated guides may also be linked to supporting information, including but not limited to clinical study reports, supporting data from models and simulations, survival curves, and cost effectivity data, as illustrated in FIGS. 16A, 16B, and 16C, respectively.

XML Syntax and Semantics According to an Exemplary Embodiment

One of ordinary skill in the art will readily see that the following XML Document Type Definition (Table 1) and XML Schema (Table 2), along with the syntax description provided in Table 3 provide an exemplary embodiment of HGML.

TABLE 1

```
< ?xml version="1.0"?>
< !DOCTYPE HGML SYSTEM "hgml.dtd">
< !ELEMENT HGML (Statement) ? >
< !ELEMENT Statement
(# PCDATA | Statement | Condition | Recommendation) ? >
< !ATTLIST Statement
    id CDATA # IMPLIED
    identifier CDATA # IMPLIED
    exception CDATA # IMPLIED>
< !ELEMENT Recommendation (# PCDATA | Keyword)? >
< !ATTLIST Recommendation
        id CDATA # IMPLIED
        identifier CDATA # IMPLIED>
< !ELEMENT Condition (# PCDATA | Condition | Variable | Relation) ?
< !ATTLIST Condition
        id CDATA # IMPLIED
        identifier CDATA # IMPLIED
    operator (AND | OR | NOT | at-least | at-most) "OR"
    reference CDATA # IMPLIEID
    expression CDATA # IMPLIED>
< !ELEMENT Variable (# PCDATA) + >
< !ATTLIST Variable
        id CDATA # IMPLIED>
        identifier CDATA # IMPLIED>
< !ELEMENT Relation (# PCDATA | Varaible) ? >
< !ATTLIST Relation
        Operator (equal-to | less-than | greater-than | in-range)
# IMPLIED
    Value %numeric; # IMPLIED
    Min %numeric; # IMPLIED
    Max %numeric; # IMPLIED>
< !ELEMENT Keyword (# PCDATA)>
< !ATTLIST Keyword
        id CDATA # IMPLIED
        identifier CDATA # IMPLIED>
< !- - Allow numeric to be an identifier of another supposed
numeric - - >
< !ENTITY % numeric CDATA>
```

TABLE 2

```
<?xml version="1.0"? >
<xs:schema xmlns:xs="http://www.w3.org/2001/XMLSchema">
    <xs:element name="HGML">
        <xs:complexType>
            <xs:sequence minOccurs="0">
                <xs:element ref="Statement"/ >
            </xs:sequence>
        </xs:complexType>
    </xs:element>
    <xs:element name="Statement">
        <xs:complexType mixed="true">
            <xs:choice minOccurs="0">
                <xs:element ref="Statement" />
                <xs:element ref="Condition" />
                <xs:element ref="Recommendation" />
            </xs :choice>
            <xs:attribute name="id" type="xs:string" />
            <xs:attribute name="identifier" type="xs:string" />
            <xs:attribute name="exception" type="xs:string" />
        </xs:complexType>
    </xs:element>
    <xs:element name="Recommendation">
        <xs:complexType mixed="true">
            <xs:choice minOccurs="0">
                <xs:element ref="Keyword" />
            </xs:choice>
            <xs:attribute name="id" type="xs:string" />
            <xs:attribute name="identifier" type="xs:string" />
        </xs:complexType>
    </xs:element>
    <xs:element name="Condition">
        <xs:complexType mixed="true">
            <xs:choice minOccurs="0">
                <xs:element ref="Condition" />
                <xs:element ref="Variable" />
                <xs:element ref="Relation" />
            </xs choice>
            <xs:attribute name="id" type="xs:string" />
            <xs:attribute name="identifier" type="xs:string" />
            <xs:attribute name="operator" default="OR">
                <xs:simpleType>
                    <xs:restriction base="xs:string">
                        <xs:enumeration value="AND" />
                        <xs:enumeration value="OR" />
                        <xs:enumeration value="NOT" />
                        <xs:enumeration value="at-least" />
                        <xs:enumeration value="at-most" />
                    </xs:restriction>
                </xs:simpleType>
            </xs:attribute>
            <xs:attribute name="reference" type="xs:string" />
            <xs:attribute name="expression" type="xs:string" />
        </xs:complexType>
    </xs:element>
    </xs:element name="Variable">
        </xs:complexType>
            <xs:simpleContent>
                <xs:extension base="xs:string">
                    <xs:attribute name="id" type="xs:string" />
                </xs:extension>
            </xs:simpleContent>
        </xs:complexType>
    </xs:element>
    </xs:element name="Relation">
        <xs:complexType mixed="true">
            <xs:choice minOccurs="0">
                <xs:element ref="Varaible" />
            </xs:choice>
            <xs:attribute name="Operator">
                <xs:simpleType>
                    <xs:restriction base="xs:string">
                        <xs:enumeration value="equal-to" />
                        <xs:enumeration value="less-than" />
                        <xs:enumeration value="greater-than" />
                        <xs:enumeration value="in-range" />
                    </xs:restriction>
                </xs:simpleType>
            </xs:attribute>
```

TABLE 2-continued

```
            <xs:attribute name="Value" type="numeric" />
            <xs:attribute name="Min" type="numeric" />
            <xs:attribute name="Max" type="numeric" />
        </xs:complexType>
    </xs:element>
    <xs:element name="Keyword">
        <xs:complexType>
            <xs:simpleContent>
                <xs:extension base="xs:string">
                    <xs:attribute name="id" type="xs:string" />
                    <xs:attribute name="identifier" type="xs:
                        string" />
                </xs:extension>
            </xs:simpleContent>
        </xs:complexType>
    </xs:element>
</xs:schema>
```

Table 3 contains a specification of HGML with notes on semantics, in a BNF-like format. However, terms appear without the traditional angle brackets to avoid confusion with XML tags. XML tags and string literals are enclosed in single quotes. Double quotes are literal, i.e., "Label" refers to a Label token appearing in the document which may be surrounded by with double quotes.

TABLE 3

HGML-document : := HGML-content
HGML-content : := {A | Statement | Condition | Recommendation
      | Variable | Keyword}*
. That is, any number of statements, conditions,
recommendations, and variables may appear interspersed with free
text (A) .
. Conditions, recommendations, and variables (or free text for
that matter) appearing in the document outside the context of a
statement imply that they are contained within an implicit
statement whose scope is the entire document. Thus,
recommendations in this context are conditioned by any
conditions and variables they appear along with.
. Although free text (A) is allowed outside any statement, it
is discouraged, as it is desirable to "account for" all sections
of a docuement.
A : := arbitrary, alphanumeric, free text including XML markup
tags for elements (such as HTML) other than HGML
Statement : := "<statement" [{identifier | id} = "Label"]
                  [exception="Label"] ">"
                  HGML-content
                  "</statement>"
. Conditions appearing within a statement define a "conditional
context" used to determine the relevance of conditions
. Multiple conditions appearing in the same statement are
considered a logical disjunction ("ORed") for evaluation
purposes. Thus, if either is true, the conditional context is
determined to be true.
. Statements appearing within statement are referred to as
"sub-statements" of the surrounding "parent" statement.
. The conditional context of a sub-statement is considered to
be combined through logical conjunction ("ANDed") with that of
its parent statement. Thus, the conditions of the sub-statment
further refine those of the parent statement.
. If the "exception" attribute is present, the conditional
context of the, result of the statement or condition named by
Label is augmented by the conjunction with the negation of the
current statement.
. Any variable appearing outside a conditon is assumed to be
boolean condition, effectively surrounded by a condition, True
unless it evalutes to 0 or False.
. The identifier/id Label allows the statement to be referenced
from elsewhere. "Identifier" and "ID" are synonyms.
Recommendation : : "<recommendation" [{identifier | id} = "Label"] ">"
                  {A | Keyword}*
                  "</recommendation>"
. Recommendations appearing within a statement are deemed
relevant to a case [for which the the HGML-document is applied]

TABLE 3-continued according to the clinical context of the statement in which they are contained.
The free text within the scope of the recommendation may be returned if relevant.
Condition : := "<condition"
                     [{identifier | id}="Label"]
                     [operator="Operator"]
                     [reference="Label"]
                     [{expression | expr}="Expression"] ">"
         Conditional-content
         "</condition>"
Operator : := {AND | OR | NOT | at-least | at-most }*
Conditional-content : := {A | Condition | Relation | Variable}*
. In the absence of a Relation, variables within conditions are expected to evaluate to boolean truth values. [See Relation below]
. Multiple conditions or variables found within conditions are by default considered to be combined through disjunction ("ORed")
       (i) unless specified otherwise through the optional "operator" attribute;
       (ii) overrided through the "expression" attribute; or
       (iii) the reference attribute applies the conditional context specified by a label associated with another condition or statement.
. [If other attributes or contained elements are present, they may be combined with the referenced condition accordingly (not implemented in the current evaluator, generally reference conditions are intended to be atomic, combined through parent-conditions)]
. The identifier/id Label allows the condition to be referenced from elsewhere. "Identifier" and "ID" are synonyms.
Variable : := "<variable" [{identifier | id}="Label"] ">"
            A
         "</variable>"
. The surrounded text is associated with the optional, but usually provided variable identifier, so that it may be linked to an external thesaurus (such as UMLS) . If no identifier is given, the text will make up the identifier in a query to determine its value during application to a particular case.
Relation : := "<relation"
                     [operator="Relational-Op"]
                     [value="Numeric-Expression"]
                     [min="Numeric-Expression"]
                     [max="Numeric-Expression"]
                     ">"
            A
         "</relation>"
Relational-op : := {equal-to | less-than | greater-than | in-range} *
. If present in a condition, a Relation imposes a relation between a variable and some quantity specified in the relation"s attributes used to determine the truth value of the condition.
Keyword : := "<keyword "[{identifier | id} "="" Label """] ">"
            A
         "</keyword>"
. A keyword appearing a Recommendation, typically identifies the action (such as a medical treatment) associated with the recommendation. The identifier, when specified, allows association with a specific term in an external thesaurus (such as UMLS). In this context, a keyword can simultaneously serve as a hyperlink to further elaborations, definitions, etc. of the term.
. A keyword appearing in HGML-Content similarly allows the association with an identifier for external association, but within the document can serve as the basis for an anchors, link or indexing.
One possible heuristic for implementation is to have keywords in un-conditioned statements serve as anchors for links of those same keywords appearing in conditioned statements, with the assumption that unconditioned statements provide background for the identified keywords which are hyperlinked to those keywords appearing in recommendations.
Numeric-Expression : := numerical expression
Expression : := infix expression
. An infix expression, which may contain numeric and variable binding, expressions is expected to ultimately evaluate to a truth value.

Evaluation Engine

Since HGML conforms to XML standards, HGML documents can be easily parsed by public domain software such as XML4C to produce a structure in which each element is represented by a node in a tree. For example, if the document consists of three top level statements, the first node in the tree will have three children representing them. If one such statement contains a condition, a [sub-] statement, a keyword, and a recommendation, each will be represented as a child of the corresponding node.

This representation can be used by an algorithm to evaluate the content of the document to produce recommendations when particular instantiations of variables is available, or to produce a set of rules which express the mapping from variables to recommendations. The ability to represent the guideline by a set of rules allows for manipulation and evaluation on a wider variety of platforms.

While one embodiment of the present invention produces recommendations directly through the traversal of the tree of elements, an alternate implementation of the evaluation engine (gleval.cpp) can evaluate an HGML document by first traversing the tree of elements to produce such a set of rules. This rule-set is then evaluated against known values of variables to produce recommendations. The rule-set may be generated through a relatively straightforward recursive algorithm which visits each node in the tree "depth first" by starting at the top and visiting each child of each node encountered. Since each sub-tree implies containment in the document, each condition encountered will depend on any conditions on the path to the root of the tree. At any point in the tree, the components of conditions, variables and relations upon those variables can be considered as a logical expression forming the antecedent of a rule. Each recommendation encountered will form the consequent of a rule, dependant on all conditions appearing with and above it in the tree.

This algorithm may maintain a list of "rule antecedents" for each condition encountered in the tree which is referenced or potentially has more than one recommendation appearing below it. This allows for more efficient processing by allowing each such condition to be evaluated a single time regardless of the number of recommendations which are conditionally dependent on it. This is also important since the concept of the "reference" element allows dependence on conditions appearing elsewhere in the document, outside the usual containment structure of the tree. By itemizing "rule antecedents," they may be referenced individually as required to compose the logical conditions for each recommendation.

Once parsed, the conditional structure of the document allows for application to specific cases and comprehensive summary. For example, a set of recommendations can be produced for a specific case (conditional context) by assessing the truth, or uncertainty, of the associated conditions based on the underlying variables. Not only can those recommendations associated with "true" conditions can be returned, but those having uncertain evidence can be indicated.

Also, a degree of consistency checking can be provided by considering the space of all conditions: one can determine to what extent the space is covered by recommendations, indicating gaps or overlap. This information could be useful to guideline developers or others desiring a comprehensive summary of the content. The space of all conditions can be systematically explored and itemized by considering each possible value of each variable. For n strictly Boolean (true or false) variables this will result in 2^n possible "conditional contexts," some or all covered by the conditions of the document. Ranges of real-valued variables can be handled by determining cut-offs from the associated relations imposed on those variables in the HGML conditions.

Additionally, the HGML representation can facilitate additional consistency checking given additional semantic information about the recommendations. By using the keywords appearing in recommendations as links to descriptions of their semantic content in some external knowledge-base (such as UMLS for medical terminology), competing recommendations can be compared. A systematic search of all "conditional contexts" can determine whether two incompatible or contradictory recommendations are to be recommended under the same conditions and, if so, produce a warning or other indication to guideline developers or other users of the system.

Alternate Embodiments

The order in which the steps of the present method are performed is purely illustrative in nature. In fact, the steps can be performed in any order or in parallel, unless otherwise indicated by the present disclosure.

The method of the present invention may be performed in either hardware, software, or any combination thereof, as those terms are currently known in the art. In particular, the present method may be carried out by software, firmware, or microcode operating on a computer or computers of any type. Additionally, software embodying the present invention may comprise computer instructions in any form (e.g., source code, object code, interpreted code, etc.) stored in any computer-readable medium (e.g., ROM, RAM, magnetic media, punched tape or card, compact disc (CD) in any form, DVD, etc.). Furthermore, such software may also be in the form of a computer data signal embodied in a carrier wave, such as that found within the well-known Web pages transferred among devices connected to the Internet. Accordingly, the present invention is not limited to any particular platform, unless specifically stated otherwise in the present disclosure.

While particular embodiments of the present invention have been shown and described, it will be apparent to those skilled in the art that changes and modifications may be made without departing from this invention in its broader aspect and, therefore, the appended claims are to encompass within their scope all such changes and modifications as fall within the true spirit of this invention.

REFERENCES

The following publications, cited by "[number]" above, are hereby incorporated herein by reference in their entireties.

1. S. R. Tunis, R. S. A. Hayward, M. C. Wilson, H. R. Rubin, E. B. Bass, M. Johnston, E. P. Steinberg, *Internists" Attitudes about Clinical Practice Guidelines*, Annals of Internal Medicine, 120:9 56-63 (1994).
2. A. G. Ellrodt, L. Conner, M. Eriedinger, S. Weinggarten, *Measuring and Improving Physician Compliance with Clinical Practice Guidelines: A Controlled Interventional Trial*, Annals of Internal Medicine, 122:277-82 (1995).
3. J. Lomas, G. M. Anderson, K. Domnick-Pierre, E. Vayda, M. W. Enkin, W. J. Hannah, *Do Practice Guidelines Guide Practice? The Effect of a Consensus Statement on the Practice of Physicians*, New Engl. J Med., 321:1306-11 (1989).
4. National Guideline Clearinghouse, [Online] Available: http://www.guidelines.gov (March, 2000).
5. W. M. Tierney, J. M. Overhage, B. Y. Takesue, L. E. Harris, M. D. Murray, D. L. Vargo, C. J. McDonald, *Computerizing guidelines to improve care and patient outcomes: the example of heart failure*, Journal of the American Medical Informatics Association, 2(5):316-22 (September-October 1995).
6. L. Ohno-Machado, J. H. Gennari, S. N. Murphy, N. L. Jain, S. W. Tu, D. E. Oliver, E. Pattison-Gordon, R. A. Greenes, E. H. Shortliffe, G. O. Barnett, *The guideline interchange format: a model for representing guidelines*, Journal of the American Medical Informatics Association, 5(4):357-72 (July-August 1998).
7. World Wide Web Consortium, [Online] Available: http://www.w3.org (July, 2000).
8. American College of Physicians, *Guidelines for medical treatment for stoke prevention*, Annals of Internal Medicine, Vol. 121, No. 1 (July 1994).

Trademark Notice

Microsoft and Microsoft Internet Explorer are registered trademarks of Microsoft Corp., Redmond, Wash. Microsoft Word is a trademark of Microsoft Corp. Adobe is a registered trademark of Adobe Systems, Inc. of San Jose, Calif. W3C is a registered trademark of the Massachusetts Institute of Technology. Other trademarks, trade names, and service names are the property of their respective owners.

We claim:

1. A method of converting an electronic document into hypertext, comprising:

parsing said electronic document to identify a plurality of variables, recommendations, and logical relationships therebetween;

formulating a rule for each said variable from said logical relationships and said recommendations;

associating one or more corresponding tags with each said variable, relation, and condition of said logical relationships as they appear in the conditional expression text of the electronic document and each said recommendation text of the electronic document, using said rule to form a nested structure of variable, relation, condition and recommendation tags;

inserting into said electronic document, in proximity to the corresponding text to delimit said variables, relations, conditional expressions and recommendations, said one or more corresponding tags to form a hypertext document with said nested tag structure;

said associating step further including the insertion of statement tags that surround and delimit portions of text that include proximal condition and recommendation tags and thus express the relationship between said conditions and said recommendation;

specifying a unique identifier and logical operator in association with selected ones of said condition tags;

using the nested structure of said tags to indicate their relationship, thereby taking advantage of the likelihood that related components of natural language prose appears in close proximity;

using the context of conditional expressions through said nesting of tags to allow automatic parsing and construction of logical expressions and their association with proximal recommendation content;

said associating step further including forming tags that reference the unique identifier of said condition tags for associating elements that do not appear in direct proximity;

inserting said reference tags within their associated nested context to provide the mechanism for association with other respective uniquely identified elements;

processing said condition tag structure according to any specified logical operators to determine whether said portions of text are true or false and to further determine the relevancy of proximal recommendations; and displaying said hypertext on a user computer, wherein said displaying distinctively presents said variables and recommendations according to each said corresponding tag.

2. The method of claim 1, wherein said electronic document comprises at least one of a group of elements consisting of text symbols, graphical elements, audio data, video data, and pre-defined hypertext.

3. The method of claim 1, further comprising inserting one or more hyperlinks in proximity to one or more of said corresponding tags, said hyperlinks pointing to external data related to said proximate corresponding tag.

4. The method of claim 1, further comprising validating said hypertext document.

5. The method of claim 1, wherein said associating further comprises logically relating two or more variables with one said recommendation to form a conditional recommendation in an iterative fashion, thus forming a plurality of conditional recommendations.

6. The method of claim 5, wherein said associating further comprises diagramming said conditional recommendation with a graphical user interface.

7. The method of claim 5, further comprising applying one or more facts to said hypertext document to form a decision by comparing said facts to said conditional recommendations.

8. The method of claim 1, further comprising:

distributing said hypertext document over a network to one or more user computers; and displaying said hypertext on at least one of said user computers;

wherein said displaying distinctively presents said variables and recommendations according to each said corresponding tag.

9. The method of claim 8, wherein said network is selected from a group consisting of the Internet, an intranet, a private network, a virtual private network, or a network of networks.

10. The method of claim 8, wherein said user computer comprises one of the group consisting of a personal computer, personal digital assistant, handheld computer, laptop computer, notebook computer, computer workstation, and a telephone.

11. An apparatus for converting an electronic document into hypertext, comprising:

means for parsing said electronic document to identify a plurality of variables, recommendations, and logical relationships therebetween;

means for formulating a rule for each said variable from said logical relationships and said recommendations;

means for associating one or more corresponding tags with each said variable, relation, and condition of said logical relationships as they appear in the conditional expression text of the electronic document and each said recommendation text of the electronic document, using said rule to form a nested structure of variable, relation, condition and recommendation tags;

means for inserting into said electronic document, in proximity to the corresponding text to delimit said variables, relations, conditional expressions and recommendations, said one or more corresponding tags to form a hypertext document with said nested tag structure;

said means for associating further including means for the insertion of statement tags that surround and delimit portions of text that include proximal condition and recommendation tags and thus express the relationship between said conditions and said recommendation;

means for specifying a unique identifier and logical operator in association with selected ones of said condition tags;

means for using the nested structure of said tags to indicate their relationship, thereby taking advantage of the likelihood that related components of natural language prose appears in close proximity;

means for using the context of conditional expressions through said nesting of tags to allow automatic parsing and construction of logical expressions and their association with proximal recommendation content;

said means for associating further including means for forming tags that reference the unique identifier of said condition tags for associating elements that do not appear in direct proximity;

means for inserting said reference tags within their associated nested context to provide the mechanism for association with other respective uniquely identified elements;

means for processing said condition tag structure according to any specified logical operators to determine whether said portions of text are true or false and to further determine the relevancy of proximal recommendations; and means for displaying said hypertext on a user computer, wherein said means for displaying distinctively presents said variables and recommendations according to each said corresponding tag.

12. The apparatus of claim 11, wherein said electronic document comprises at least one of a group of elements consisting of text symbols, graphical elements, audio data, video data, and pre-defined hypertext.

13. The apparatus of claim 11, further comprising means for inserting one or more hyperlinks in proximity to one or more of said corresponding tags, said hyperlinks pointing to external data related to said proximate corresponding tag.

14. The apparatus of claim 11, further comprising means for validating said hypertext document.

15. The apparatus of claim 11, wherein said means for associating further comprises means for logically relating two or more variables with one said recommendation to form a conditional recommendation in an iterative fashion, thus forming a plurality of conditional recommendations.

16. The apparatus of claim 15, wherein said means for associating further comprises means for diagramming said conditional recommendation with a graphical user interface.

17. The apparatus of claim 15, further comprising means for applying one or more facts to said hypertext document to form a decision by comparing said facts to said conditional recommendations.

18. The apparatus of claim 11, further comprising:

means for distributing said hypertext document over a network to one or more user computers; and means for displaying said hypertext on at least one of said user computers;

wherein said means for displaying distinctively presents said variables and recommendations according to each said corresponding tag.

19. The apparatus of claim 18, wherein said network is selected from a group consisting of the Internet, an intranet, a private network, a virtual private network, or a network of networks.

20. The apparatus of claim 18, wherein said user computer comprises one of the group consisting of a personal computer, personal digital assistant, handheld computer, laptop computer, notebook computer, computer workstation, and a telephone.

21. A computer system for use in converting an electronic document into hypertext, comprising computer instructions for:
  parsing said electronic document to identify a plurality of variables, recommendations, and logical relationships therebetween;
  formulating a rule for each said variable from said logical relationships and said recommendations;
  associating one or more corresponding tags with each said variable, relation, and condition of said logical relationships as they appear in the conditional expression text of the electronic document and each said recommendation text of the electronic document, using said rule to form a nested structure of variable, relation, condition and recommendation tags;
  inserting into said electronic document, in proximity to the corresponding text to delimit said variables, relations, conditional expressions and recommendations, said one or more corresponding tags to form a hypertext document with said nested tag structure;
  said associating step further including the insertion of statement tags that surround and delimit portions of text that include proximal condition and recommendation tags and thus express the relationship between said conditions and said recommendation;
  specifying a unique identifier and logical operator in association with selected ones of said condition tags;
  using the nested structure of said tags to indicate their relationship, thereby taking advantage of the likelihood that related components of natural language prose appears in close proximity;
  using the context of conditional expressions through said nesting of tags to allow automatic parsing and construction of logical expressions and their association with proximal recommendation content;
  said associating step further including forming tags that reference the unique identifier of said condition tags for associating elements that do not appear in direct proximity;
  inserting said reference tags within their associated nested context to provide the mechanism for association with other respective uniquely identified elements;
  processing said condition tag structure according to any specified logical operators to determine whether said portions of text are true or false and to further determine the relevancy of proximal recommendations; and
  displaying said hypertext on a user computer, wherein said displaying distinctively presents said variables and recommendations according to each said corresponding tag.

22. The computer system of claim 21, wherein said electronic document comprises at least one of a group of elements consisting of text symbols, graphical elements, audio data, video data, and pre-defined hypertext.

23. The computer system of claim 21, further comprising computer instructions for inserting one or more hyperlinks in proximity to one or more of said corresponding tags, said hyperlinks pointing to external data related to said proximate corresponding tag.

24. The computer system of claim 21, further comprising computer instructions for validating said hypertext document.

25. The computer system of claim 21, wherein said computer instructions for associating further comprise computer instructions for logically relating two or more variables with one said recommendation to form a conditional recommendation in an iterative fashion, thus forming a plurality of conditional recommendations.

26. The computer system of claim 25, wherein said computer instructions for associating further comprise computer instructions for diagramming said conditional recommendation with a graphical user interface.

27. The computer system of claim 25, further comprising computer instructions for applying one or more facts to said hypertext document to form a decision by comparing said facts to said conditional recommendations.

28. The computer system of claim 21, further comprising computer instructions for:
  distributing said hypertext document over a network to one or more user computers; and
  displaying said hypertext on at least one of said user computers;
  wherein said displaying distinctively presents said variables and recommendations according to each said corresponding tag.

29. The computer system of claim 28, wherein said network is selected from a group consisting of the Internet, an intranet, a private network, a virtual private network, or a network of networks.

30. The computer system of claim 28, wherein said user computer comprises one of the group consisting of a personal computer, personal digital assistant, handheld computer, laptop computer, notebook computer, computer workstation, and a telephone.

31. A computer-readable storage medium storing a computer program executable by a computer, the computer program comprising computer instructions for:
  parsing said electronic document to identify a plurality of variables, recommendations, and logical relationships therebetween;
  formulating a rule for each said variable from said logical relationships and said recommendations;
  associating one or more corresponding tags with each said variable, relation, and condition of said logical relationships as they appear in the conditional expression text of the electronic document and each said recommendation text of the electronic document, using said rule to form a nested structure of variable, relation, condition and recommendation tags;
  inserting into said electronic document, in proximity to the corresponding text to delimit said variables, relations, conditional expressions and recommendations, said one or more corresponding tags to form a hypertext document with said nested tag structure;
  said associating step further including the insertion of statement tags that surround and delimit portions of text that include proximal condition and recommendation tags and thus express the relationship between said conditions and said recommendation;
  specifying a unique identifier and logical operator in association with selected ones of said condition tags;
  using the nested structure of said tags to indicate their relationship, thereby taking advantage of the likelihood that related components of natural language prose appears in close proximity;

using the context of conditional expressions through said nesting of tags to allow automatic parsing and construction of logical expressions and their association with proximal recommendation content;

said associating step further including forming tags that reference the unique identifier of said condition tags for associating elements that do not appear in direct proximity;

inserting said reference tags within their associated nested context to provide the mechanism for association with other respective uniquely identified elements;

processing said condition tag structure according to any specified logical operators to determine whether said portions of text are true or false and to further determine the relevancy of proximal recommendations; and displaying said hypertext on a user computer, wherein said displaying distinctively presents said variables and recommendations according to each said corresponding tag.

32. The computer-readable storage medium of claim 31, wherein said electronic document comprises at least one of a group of elements consisting of text symbols, graphical elements, audio data, video data, and pre-defined hypertext.

33. The computer-readable storage medium of claim 31, further comprising computer instructions for inserting one or more hyperlinks in proximity to one or more of said corresponding tags, said hyperlinks pointing to external data related to said proximate corresponding tag.

34. The computer-readable storage medium of claim 31, further comprising computer instructions for validating said hypertext document.

35. The computer-readable storage medium of claim 31, wherein said computer instructions for associating further comprise computer instructions for logically relating two or more variables with one said recommendation to form a conditional recommendation in an iterative fashion, thus forming a plurality of conditional recommendations.

36. The computer-readable storage medium of claim 35, wherein said computer instructions for associating further comprise computer instructions for diagramming said conditional recommendation with a graphical user interface.

37. The computer-readable storage medium of claim 35, further comprising computer instructions for applying one or more facts to said hypertext document to form a decision by comparing said facts to said conditional recommendations.

38. The computer-readable storage medium of claim 31, further comprising computer instructions for:

distributing said hypertext document over a network to one or more user computers; and displaying said hypertext on at least one of said user computers;

wherein said displaying distinctively presents said variables and recommendations according to each said corresponding tag.

39. The computer-readable storage medium of claim 38, wherein said network is selected from a group consisting of the Internet, an intranet, a private network, a virtual private network, or a network of networks.

40. The computer-readable storage medium of claim 38, wherein said user computer comprises one of the group consisting of a personal computer, personal digital assistant, handheld computer, laptop computer, notebook computer, computer workstation, and a telephone.

* * * * *